United States Patent
Sakoda et al.

(10) Patent No.: US 6,992,973 B2
(45) Date of Patent: *Jan. 31, 2006

(54) TRANSMITTING APPARATUS, RECEIVING APPARATUS, COMMUNICATION SYSTEM, TRANSMISSION METHOD, RECEPTION METHOD, AND COMMUNICATION METHOD

(75) Inventors: Kazuyuki Sakoda, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/085,497

(22) Filed: Mar. 21, 2005

(65) Prior Publication Data

US 2005/0174933 A1    Aug. 11, 2005

Related U.S. Application Data

(62) Division of application No. 09/656,152, filed on Sep. 6, 2000, now Pat. No. 6,882,618.

(30) Foreign Application Priority Data

Sep. 7, 1999    (JP) .............................. P11-252741

(51) Int. Cl.
    *H04J 11/00*    (2006.01)

(52) U.S. Cl. .................. 370/208; 370/204; 370/210; 375/260

(58) Field of Classification Search ................ 370/204, 370/205
    See application file for complete search history.

(56) References Cited

U.S. PATENT DOCUMENTS

| | | | | |
|---|---|---|---|---|
| 5,907,583 A | * | 5/1999 | Sakoda et al. | 375/260 |
| 6,070,056 A | * | 5/2000 | Sakoda et al. | 455/67.11 |
| 6,243,423 B1 | * | 6/2001 | Sakoda et al. | 375/262 |
| 6,347,120 B1 | * | 2/2002 | Sakoda | 375/259 |
| 6,442,130 B1 | * | 8/2002 | Jones et al. | 370/208 |
| 6,456,699 B1 | * | 9/2002 | Burg et al. | 379/88.17 |
| 6,519,292 B1 | * | 2/2003 | Sakoda et al. | 375/295 |
| 6,563,881 B1 | * | 5/2003 | Sakoda et al. | 375/260 |
| 6,654,429 B1 | * | 11/2003 | Li | 375/316 |

* cited by examiner

*Primary Examiner*—Bob A. Phunkulh
(74) *Attorney, Agent, or Firm*—Jay H. Maioli

(57) ABSTRACT

A transmitting apparatus, receiving apparatus, communication system, and a signal processing method for each apply a suitable modulation method and transmission path estimation method in accordance with the characteristics of the transmission information and capable of improving the transmission efficiency. At the transmission side, the method of estimation of the transmission path and the modulation method are selected in accordance with an attribute of the data to be transmitted, for example, the size of a packet to be transmitted, the transmission data is mapped by the selected modulation method, the signal is processed in accordance with the transmission path estimation method, and a transmission signal is created by increase fast Fourier transform processing and transmitted. At the reception side, the received signal is fast Fourier transformed, the transmission path is estimated by the transmission path estimation method selected at the transmission side, the received signal is corrected in accordance with the result, and the received data is reproduced in accordance with the modulation method. Therefore, it is possible to always adopt the optimum transmission method in accordance with the attribute of the transmission data etc. and possible to realize an improvement of a transmission efficiency and an enhancement of the quality of communication.

4 Claims, 17 Drawing Sheets

TRANSMITTING APPARATUS, RECEIVING APPARATUS, COMMUNICATION SYSTEM, TRANSMISSION METHOD, RECEPTION METHOD, AND COMMUNICATION METHOD

This is a division of Ser. No. 09/656,152 filed on Sep. 6, 2000 now U.S. Pat. No. 6,882,618.

BACKGROUND OF THE INVENTION

The present invention relates to a transmitting apparatus and a receiving apparatus of orthogonal frequency division multiplexing (OFDM) modulated signals, a communication system comprising a transmitting apparatus and a receiving apparatus, and further a signal processing method in each of the transmitting apparatus, receiving apparatus, and the communication system.

As a system of transmitting multiplexed channels using multi-carrier communication, a digital audio broadcasting (DAB) system has already been put into practical use in Europe. In the DAB system, OFDM is used as the modulation method. In a broadcasting system using the OFDM modulation method, a plurality of orthogonal sub-carriers modulated by quadrature phase shift keying (QPSK) or quadrature amplitude modulation (QAM) or another data modulation method are multiplexed to produce an OFDM modulated signal. By providing a guard interval which is made by recurring part of an effective symbol waveform in a valid symbol period of the OFDM signal, the influence of multi-path error (ghost wave) in a radio wave transmission of a ground wave can be reduced. Namely, by making the guard interval longer than the expected delay time of the ghost wave, ghost interference can be easily removed at the reception side.

FIG. 22 and FIG. 23 show an example of a wireless communication system using the OFDM modulation method, in which FIG. 22 shows a configuration of a transmitting apparatus using the OFDM modulation method, and FIG. 23 shows the configuration of a receiving apparatus for receiving an OFDM modulated signal.

As shown in FIG. 22, a transmitting apparatus using the OFDM modulation method is configured by a channel encoder 101, a time interleave circuit 102, a symbol mapping circuit 103, a multiplex circuit (MUX) 104, a frequency interleave circuit 105, a differential modulation circuit 106, an inverse fast Fourier transform circuit (IFFT) 107, and a transmitter (Tx) 108. The channel encoder 101 encodes an input data bit train (bit stream) DBSM of an M-th channel. Note that the related encoding includes, for example, error correction and encoding. The order of the encoded data train is switched at random on the time axis by the time interleave circuit 102. Time interleaving is a method for coping with so-called burst noise, that is, a large amount of noise generated in a transmission path concentrated in a certain constant time band. Time interleaving is carried out with respect to a data series to be transmitted on the transmission side, while deinterleaving is carried out on the reception side to return the received data series to the original order. For this reason, when burst noise is generated, the influence of the noise is dispersed in the transmission signal and complete interruption of data transmission can be prevented.

The time interleaved data is mapped by the symbol mapping circuit 103 with respect to each sub-carrier in accordance with a predetermined data modulation method. Note that the data modulation method used for the mapping may be of various types such as the QPSK, 8PSK, and the 16QAM. Typically QPSK is used in DAB. The symbol mapping circuit 104 creates a symbol stream corresponding to the input data series.

The mapped symbol stream consisting of the M channels is input together with the symbol streams of other channels created by similar processing to the multiplex circuit 104. Only inputs DBS 1 and DBS 2 are shown. The stream is then multiplexed by the multiplex circuit 104. As the simplest example, the multiplex circuit 104 can realize multiplexing by simply connecting the symbol streams of the plurality of channels in series. The multiplexed symbol streams are rearranged by the frequency interleave circuit 105, and the differential modulation circuit 106 differentially modulates each symbol with the respective symbol transmitted one modulation period before.

The differentially modulated symbol streams are converted to parallel data by a serial/parallel conversion circuit, not shown. This parallel data becomes the modulated data in each sub-carrier and can be regarded as a vector of a spectrum on a frequency axis. The modulated data is transformed to a transmission signal on the time axis by the inverse fast Fourier transform circuit 107, modulated to a high transmission frequency by the transmitter 108, and radiated to space via an antenna 109.

On the reception side, reverse processing to that on the transmission side is carried out to demodulate the received OFDM modulated wave and thereby to reproduce the original information data streams. As shown in FIG. 23, the receiving apparatus is configured by a channel decoder 111, a time deinterleave circuit 112, a bit extraction circuit 113, a channel selection circuit 114, a frequency deinterleave circuit 115, a differential demodulation circuit 116, a fast Fourier transform circuit (FFT) 117, and a receiver (Rx) 118. The receiver 118 receives a signal of an intended frequency band in the high frequency reception signal excited at a reception antenna 119. The received signal is converted to a baseband signal by frequency conversion. The baseband signal is Fourier transformed by the fast Fourier transform circuit 117. As a result, the received symbols corresponding to the modulated data of the sub-carriers on the frequency axis are found.

Each received symbol fluctuates in phase due to the influence of, for example, fading in the transmission path, therefore the transmission path is estimated by using the phase difference from each symbol received one modulation period before as a phase value of the received signal using each symbol received one modulation time before as a reference. The means for finding the phase of the received signal by this transmission path estimation is generally referred to as differential demodulation. The differential demodulation is carried out in the differential demodulation circuit 116. The thus extracted received symbols carrying information modulated in the phase component are returned to the original order of symbols by the frequency deinterleave circuit 115, then the symbol stream of the intended channel is extracted by the channel selection circuit 114.

The output channel stream from the channel selection circuit 114 is input to the bit extraction circuit 113. The bit extraction circuit 113 digitally demodulates the symbols of each sub-carrier to extract, for example, the received encoded bit stream for the QPSK modulated symbols. The time deinterleave circuit 112 returns the received encoded bit stream to the arrangement of the encoded bit stream of the original order by the time deinterleaving in the frame. Further, this is decoded for correcting errors by the channel decoder 111, whereby the information bit stream of the intended channel is obtained.

In a communication system comprising such a transmitting and receiving apparatus, the arrangement of symbols to be transmitted and received by the frequency axis and the time axis can be expressed as shown in FIG. 24. FIG. 24 shows the state of the symbols in the sub-carriers arranged on the frequency axis being differentially modulated with the symbols transmitted one modulation time before at the related frequency. This differential modulation is not closed in the channel. The differential modulation is carried out with the symbols of other channels.

In a communication system for transmitting multiplexed channels using the OFDM modulation method as previously proposed, the symbols of the intended channel are extracted after the transmission path is estimated for all channels together. Further, the symbols of the other channels are also necessary for extracting one channel worth of information, so by employing such a data structure isolation between channels is not possible in the modulation method and the transmission path estimation method. Since the above-mentioned DAB system is a broadcasting system and each channel is usually transmitting a signal constantly, isolation between channels in the modulation method and the transmission path estimation method has been considered.

Where handling packet transmission traffic, however, the channels are not always constantly transmitting and receiving signals, therefore with the above system configuration, modulation and demodulation become impossible, so it becomes necessary to perform the modulation and demodulation and the transmission path estimation in a closed state for every channels, that is, for every packet. Further, in general packet transmission traffic, the amount of the information to be transmitted at one time the amount of information per packet largely fluctuates from several tens of bytes to about several tens of kilobytes, for example. When handling such traffic, if modulation and demodulation are carried out by the known method the following disadvantages occur.

When differential phase modulation is applied as in the DAB system, the symbols transmitted one modulation period before are utilized as reference symbols for estimating the transmission path, therefore even in a case where desiring to transmit information which can be handled by the number of symbols in one modulation period, the transmission and the reception of two modulation periods worth of symbols including the reference become necessary. This is clearly wasteful from the viewpoint of the effective utilization of the transmission path bandwidth. In such a case, it is advisable to apply another method of estimation of the transmission path.

On the other hand, when considering the case where it is desired to transmit and receive a large volume of information, it is generally known that if the transmission path is estimated by the differential modulation used in the communication system described above, the required Eb/No, where Eb: energy per bit received by the receiving apparatus, No: received noise, Eb/No is the value expressing an S/N ratio per bit of the received data on the reception side, deteriorates by about 3 dB in comparison with the case where the estimation of the transmission path is carried out perfectly. When desiring to transmit and receive a large volume of information, transmitting symbols for estimating the transmission path in addition to the symbols modulated in accordance with information, precisely estimating the transmission path, and demodulating gives a lower total required Eb/No and enables signal transmission with a better efficiency. In this case, since transmission of the symbols for estimating the transmission path becomes necessary, the bandwidth is excessively used, but when the amount of the information to be transmitted is sufficiently large in comparison with the symbols for estimating the transmission path, resources are not wastefully used from the viewpoint of the required Eb/No. Further, if the encoding rate is raised by the amount of the lowering of the required Eb/No in order to provide exactly the bandwidth for the transmission of the symbols for the estimation of the transmission path, the bandwidth will not be excessively used.

In this way, for example, where information is transmitted in a burst-like manner and the amount of information to be transmitted per time fluctuates in a large dynamic range, as in packet transmission traffic, isolation is desirably taken in the modulation method and the transmission path estimation method for every channel. Further, preferably a different transmission path estimation method is used for every series of transmission information. The communication system of the prior art, however, has not given sufficient consideration to this.

OBJECT AND SUMMARY OF THE INVENTION

The present invention was made in view of the above situation and has as an object to provide a transmitting apparatus, a receiving apparatus, and a communication system comprising a transmitting and receiving apparatus capable of applying a suitable modulation method and transmission path estimation method in accordance with the characteristics of the information to be transmitted and capable of improving the efficiency of the information transmission and signal processing methods for each.

To attain the above object, the transmitting apparatus of the present invention includes a transmitting apparatus for transmitting a multi-carrier modulated signal having a plurality of sub-carriers modulated in accordance with the transmission data, having a transmission path estimation method selection circuit for selecting the estimation method of the transmission path in accordance with an attribute of the transmission data, a mapping circuit for arranging signal points in the plurality of sub-carriers in accordance with a set modulation method based on the transmission data, a transmission path estimation processing circuit for signal processing for estimating a transmission path for the output signal of the mapping circuit in accordance with the selected transmission path estimation method, and an orthogonal transform circuit for orthogonally transforming the output signal of the transmission path estimation processing circuit.

The receiving apparatus of the present invention includes a receiving apparatus for receiving a multi-carrier modulated signal to which a predetermined transmission path estimation is processed by a transmitting apparatus, having an orthogonal transform circuit for orthogonally transforming the received signal, a transmission path estimation circuit for estimating a characteristic of the transmission path in accordance with the processing of the estimation of the transmission path carried out by the transmitting apparatus based on the output signal of the orthogonal transform circuit, and a data output circuit for correcting the received signal in accordance with a result of the estimation of the transmission path estimation circuit and outputting the received data.

Further, the communication system of the present invention includes a communication system for transmitting and receiving a multi-carrier modulated signal created in accordance with the transmission data, employing a transmission path estimation method selection circuit for selecting the estimation method of the transmission path in accordance with an attribute of the transmission data, a mapping circuit for arranging signal points based on the transmission data by modulation methods set with respect to a plurality of sub-carriers, a transmission path estimation processing circuit for signal processing for estimating the transmission path in accordance with the selected transmission path estimation method for the output signal of the mapping circuit, a first orthogonal transform circuit for orthogonally transforming the output signal of the transmission path estimation processing circuit, a transmission circuit for transmitting the output signal of the orthogonal transform circuit to the transmission path, a reception circuit for receiving the transmission signal from the transmission path, a second orthogonal transform circuit for orthogonally transforming the output signal of the reception circuit, a transmission path estimation circuit for estimating the characteristic of the transmission path based on the processing of the estimation of the transmission path carried out by the transmission path estimation processing circuit based on the output signal of the orthogonal transform circuit, and a data output circuit for correcting the received signal in accordance with the result of the estimation of the transmission path estimation circuit and outputting the predetermined received data.

According to an aspect of the present invention, the transmission path estimation method selection circuit preferably selects the transmission path estimation method in accordance with the size of the transmission data, the importance of the transmission data, the state of the transmission channel, and the possibility of retransmitting the transmission data when transmission fails.

Further, in the present invention, the transmission path estimation processing circuit preferably has a differential modulation circuit for differential modulation with respect to the output signal of the mapping circuit, and the differential modulation circuit outputs a modulated signal in accordance with a phase difference between the transmission signal and a reference using an adjoining transmission signal on a time axis, a frequency axis, or both of the time axis and the frequency axis as the reference.

According to another aspect of in the present invention, the transmission path estimation processing circuit preferably has a pilot addition circuit for adding a transmission path estimation pilot signal to the transmission signal output by the mapping circuit. The pilot addition circuit adds the pilot signal to the transmission signal by a constant ratio from the start of the transmission and decreases the number of the pilot signals to be added for every modulation period after starting the transmission. Further, the pilot addition circuit holds the ratio of the pilot signal to be added to the transmission signal constant when a predetermined time elapses after the start of the transmission or stops the addition of the pilot signal when a predetermined time elapses after the start of the transmission in accordance with, for example, the state of the transmission.

In the present invention, the transmission path estimation circuit preferably has a differential demodulation circuit for differentially demodulating the output signal of the orthogonal transform circuit using the output signal of the orthogonal transform circuit at a predetermined time as a reference signal when the transmitting apparatus performs the differential modulation and a transmission path equalization circuit for extracting the pilot signal from the output signal of the orthogonal transform circuit and estimating the characteristics of the transmission path in accordance with the extracted pilot signal when adding the pilot signal to the transmission data by the transmitting apparatus.

According to an aspect of the present invention, the differential demodulation circuit preferably has a storage circuit for storing the output signal of the orthogonal transform circuit and a phase correction circuit for correcting the phase of the output signal of the orthogonal transform circuit with a predetermined storage signal among the stored signals as the reference in accordance with the modulation method of differential modulation in the transmitting apparatus and the transmission path equalization circuit has a pilot extraction circuit for extracting the pilot signal from the output signal of the orthogonal transform circuit, a first addition circuit, in the case where the extracted pilot signals are divided into groups established in accordance with the frequency bands, for adding pilot signals of each group with at least one pilot signal from an adjoining group, a multiplication circuit for multiplying the result of addition of pilot signals at an adjoining previous modulation time on the time axis by a predetermined coefficient, and a second addition circuit for adding the result of addition of the addition circuit at the present point of time and the output signal of the multiplication circuit.

The transmission method of the present invention includes transmitting a multi-carrier modulated signal having a plurality of sub-carriers modulated in accordance with the transmission data, employing the steps of selecting an estimation method of the transmission path in accordance with an attribute of the transmission data, performing mapping for arranging signal points in the sub-carrier in accordance with the set modulation method based on the transmission data, performing signal processing on the mapped transmission for the estimation of the transmission path in accordance with the selected transmission path estimation method, and orthogonally transforming the transmission data subjected to the transmission path estimation processing.

The reception method of the present invention includes receiving a multi-carrier modulated signal subjected to a predetermined transmission path estimation processing by the transmitting apparatus, employing the steps of orthogonally transforming the received signal, performing transmission path estimation processing based on the orthogonally transformed received signal, correcting the received signal in accordance with the result of the estimation of a transmission path, and outputting the received data.

Further, the communication method of the present invention includes transmitting and receiving a multi-carrier modulated signal created in accordance with transmission data, employing the steps of selecting an estimation method of the transmission path in accordance with an attribute of the transmission data, performing mapping for arranging signal points based on the transmission data by a modulation method set with respect to a plurality of sub-carriers, performing signal processing on the mapped transmission signal for estimating the transmission path in accordance with the selected transmission path estimation method, orthogonally transforming the signal subjected to the transmission path estimation processing, transmitting the orthogonally transformed signal to the transmission path, receiving the transmission signal from the transmission path, orthogonally transforming the received signal, estimating the characteristics of the transmission path based on the orthogonally transformed signal, correcting the received signal in accordance with the result of the estimation of transmission path, and outputting the predetermined received data.

According to the present invention, preferably the modulation method is set in accordance with an attribute of the transmission data, and preferably the transmission path estimation method includes a method of differential modulation in accordance with the phase difference between the transmission data and the reference and a method of adding a transmission path estimation pilot signal to the mapped transmission data with a constant ratio and estimating the characteristic of the transmission path in accordance with the received pilot signal on the reception side.

In the present invention, when the transmission path estimation processing is carried out by differential modulation at the transmission side, the received signal is stored and the received signal received later is differentially demodulated using a stored received signal as a reference.

Furthermore, when a pilot signal is added to the transmission signal at the transmission side, the pilot signal is extracted from among the received signal, the characteristics of the transmission path are estimated in accordance with the extracted pilot signal, and the phase and the amplitude of the received signal are corrected in accordance with the result of estimation.

According to the present invention, when transmitting information of a burst-like nature that has a large dynamic range in the size of the transmission data such as with packet transmission traffic, it is possible to use a modulation method and a transmission path estimation method suited to these conditions and transmit data with a good efficiency of the communication system as a whole in accordance with the characteristics of the transmission data, for example, the size of the transmission data per packet, the importance of the data, or the possibility of retransmission of the transmission data and further in accordance with the state of the transmission path, for example, the influence of the noise in the transmission path.

Further, in the communication system, it is possible to make the modulation method and the transmission path estimation method variable so as to design a transmitting apparatus and receiving apparatus by the smallest limit of the circuit size.

DETAILED DESCRIPTION OF PREFERRED EMBODIMENTS

Figure 1:
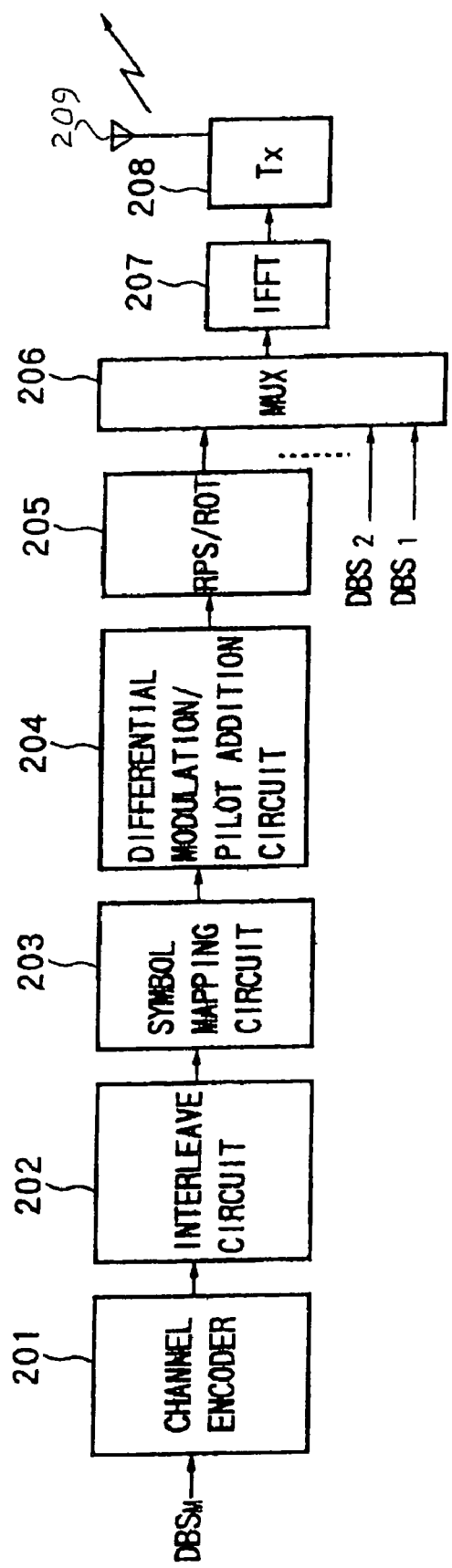
FIG. 1 is a circuit diagram of an example of the configuration of a transmitting apparatus according to the present invention.
Figure 2:
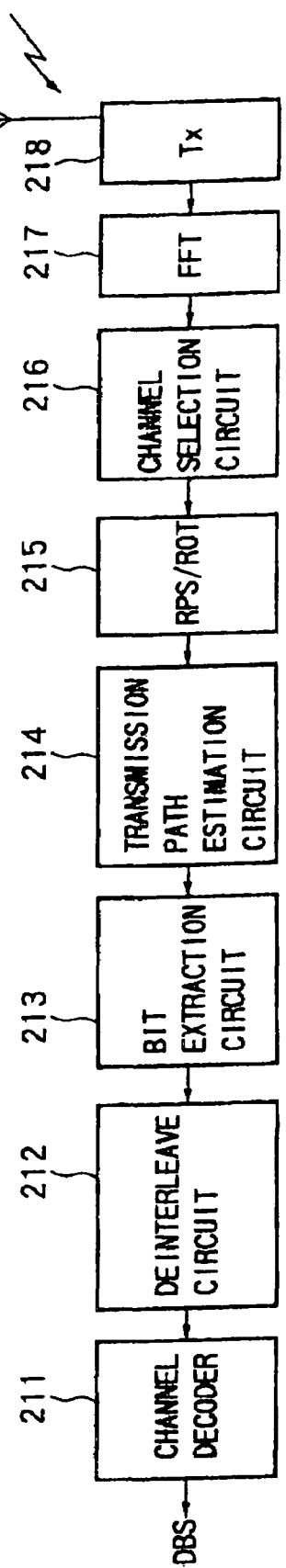
FIG. 2 is a circuit diagram of an example of the configuration of a receiving apparatus according to the present invention.

FIGS. 1 and 2 show a first embodiment according to the present invention, in which FIG. 1 is a block diagram of an example of a configuration of a transmitting apparatus according to the present invention, and FIG. 2 is a block diagram of an example of a configuration of a receiving apparatus according to the present invention.

As illustrated, the transmitting apparatus of the present embodiment is configured by a channel encoder 201, an interleave circuit 202, a symbol mapping circuit 203, a differential modulation/pilot addition circuit 204, a signal randomization circuit (RPS/ROT) 205, a multiplex circuit (MUX) 206, an inverse fast Fourier transform circuit (IFFT) 207, and a transmission circuit (Tx) 208.

The channel encoder 201 encodes an input bit stream DBSM of the M channels. Note that the related encoding includes, for example, error correction as well as encoding. The encoded data stream is supplied to the interleaver 202. The interleaver 202 performs interleaving to rearrange the order of the data of the input data stream. The interleaved data stream is supplied to the symbol mapping circuit 203. The symbol mapping circuit 203 creates a symbol stream in accordance with the data modulation method in each sub-carrier. A detailed configuration of the symbol mapping circuit 203 is explained below.

The symbol stream produced by the symbol mapping circuit 203 is input to the differential modulation/pilot addition circuit 204. The differential modulation/pilot addition circuit 204 selects the differential modulation method in accordance with the characteristics of the transmission data, for example, the amount of data of the packet in the case of packet communication or a permissible value of an error rate corresponding to the importance of the transmission information for the input symbol stream or inserts pilot symbols for estimating the transmission path. The transmission symbol stream is produced by the differential modulation/pilot addition circuit 204.

The signal randomization circuit 205 orthogonally transforms the transmission symbol stream. The orthogonal transform of the related transmission symbol stream randomizes the signal points and enables identification of an interference wave. Note that the signal randomization circuit 205 is provided in the transmitting apparatus according to need. It is also possible to omit this circuit depending on the system. The transmission symbol stream output by the differential modulation/pilot addition circuit 204 or the signal randomization circuit 205 is input to the multiplex circuit 206. The multiplex circuit 206 multiplexes the transmission symbol stream of the M channels and the transmission symbol streams of other plurality of channels and outputs a multiplexed symbol stream. Note that the transmission symbol streams of the other channels are created after substantially the same processing as that for the transmission symbol stream of the M-th channel described above.

The multiplexed symbol stream is subjected to inverse fast Fourier transform by the inverse fast Fourier transform circuit 207 to create a transmission signal on the time axis. Further, the inverse Fourier transform circuit 207 adds a guard band to the obtained transmission signal on the time axis and further restricts the time of the transmission signal by a time window. The transmission circuit 208 modulates the transmission signal output from the inverse fast Fourier transform circuit 207 to the high transmission frequency and radiates the same into space through the transmission antenna 209.

As shown in FIG. 2, the receiving apparatus of the present embodiment is configured by a channel decoder 211, a deinterleave circuit 212, a bit extraction circuit 213, a transmission path estimation circuit 214, a signal randomization demodulation circuit (RPS/ROT) 215, a channel selection circuit 216, a Fourier transform circuit (FFT) 217, and a reception circuit (Rx) 218.

The reception circuit 218 receives the signal of the intended baseband through a receiving antenna 219, converts the frequency of the received high-frequency signal and outputs the signal of the baseband. This baseband signal is supplied to the fast Fourier transform circuit 217. The fast Fourier transform circuit 217 performs a Fourier transform on the signal of the baseband input from the reception circuit 218 and finds the received symbols in each sub-carrier.

The channel selection circuit 216 selects the received symbols of the intended channel from among the received symbols of the sub-carriers obtained by the fast Fourier transform circuit 217. Note that it is also possible to arrange the channel selection circuit 216 before the Fourier transform circuit 217. In other words, the channel selection circuit 216 is provided between the reception circuit 218 and the fast Fourier transform circuit 217. Only the received signal of the intended channel in the signal of the baseband received by the reception circuit 218 is selected and supplied to the fast Fourier transform circuit 217.

The signal randomization demodulation circuit 215 orthogonally transforms the selected received symbols of the predetermined channel to return them to the original received symbol stream. Note that the signal randomization demodulation circuit 215 is provided corresponding to the signal randomization circuit 205 in the transmitting apparatus shown in FIG. 1. Namely, the transmission signal orthogonally transformed and randomized in signal points by the signal randomization circuit 205 at the transmitting apparatus is orthogonally transformed again at the receiving apparatus to return it to the original one. For this reason, when the signal is not randomized at the transmitting apparatus, the signal randomization demodulation at the receiving apparatus is unnecessary.

The transmission path estimation circuit 214 estimates a phase fluctuation of the transmission signal in the transmission path and corrects the phase fluctuation occurring in the transmission path. The phase of the received symbol stream fluctuates in the transmission path, therefore the transmission path estimation circuit 214 estimates the transmission path by differential modulation or by using pilot symbols added by the transmitting apparatus so as to estimate the phase fluctuation occurring in the received symbols due to the transmission path. Then, by using the detected amount of phase fluctuation, the phases of the received symbols are corrected to find the received symbol stream purely modulated in accordance with the transmission information. The corrected received symbol stream is supplied to the bit extraction circuit 213, and the bit extraction circuit 213 extracts the received and encoded symbol stream. Note that an explanation is made of details of the transmission path estimation circuit 214 and the bit extraction circuit 213 hereinbelow by giving concrete examples of the circuits.

The deinterleave circuit 212 rearranges the received and encoded symbol stream extracted by the bit extraction circuit 213 to return it to the original order. Namely, the transmission symbol stream rearranged by the interleave circuit 202 in the transmitting apparatus is processed in reverse, so the data forming the received and encoded symbol stream is rearranged to the original order.

The deinterleaved received and encoded symbol stream is input to the channel decoder 211. The channel decoder 211 also performs for example error correction and decoding on the received and encoded symbol stream. In this way, the bit stream corresponding to the intended channel information in the transmission signal of a plurality of channels transmitted by the transmitting apparatus is obtained. The error correction and decoding processing may, include for example, Viterbi decoding.

The communication system is configured by the transmitting apparatus and the receiving apparatus described above in regard to FIGS. 1 and 2. The communication system encodes a data stream DBSM indicating transmission information in the M-th transmission channel using the channel encoder 201, interleaves it, then maps the symbols to form a transmission symbol stream. Further, it performs differential modulation, or adds pilot symbols, in accordance with the characteristics of the transmission data and, if necessary, randomizes the signal by orthogonal processing, then inputs the result to the multiplex circuit. The transmission data streams of the other plurality of channels pass through the same processing and are input to the multiplex circuit 206 where they are multiplexed by the multiplex circuit 206 to form the multiplexed symbol stream. The multiplexed symbol streams formed in this way are subjected to an inverse Fourier transform to obtain a transmission signal on the time axis. This is modulated to a high transmission frequency by the transmission circuit 208 and transmitted.

The receiving apparatus receives the transmission signal of the intended band and converts it to the baseband by frequency conversion. It applies a Fourier transform to the received signal that has been converted to the baseband to obtain received symbols corresponding to the sub-carriers. Further, it selects the received symbols of the intended channel, restores the original symbol series by a second orthogonal transform according to need, estimates the transmission path by the transmission path estimation circuit 214, and corrects the phase fluctuation in the received symbol stream. The bit extraction circuit 213 extracts the received and encoded bit stream from the phase corrected received symbol stream, the deinterleave circuit 212 rearranges the data to restore it to the original order, and then the channel decoder 211 performs error correction and decoding.

The communication system configured in this way transmits the information data by the OFDM modulation method to realize high-precision signal transmission. It should be noted that the above transmission system was described with reference to the case where the transmitting apparatus multiplexed and transmitted a plurality of channels and the receiving apparatus received one channel among them, but an actual communication system is not limited to this. For example, there also exists a case where the transmitting apparatus transmits data by using one channel, and the receiving apparatus receives multiplexed signals.

The following is a detailed explanation of the method employed for the estimation of the transmission path in the communication system of the present embodiment. For example, in packet transmission traffic, there are cases of transmitting a small amount of data of about several bytes, such as command information, and cases of transmitting a relatively large amount of data of about tens of kilobytes. Further, there is also a demand for transmitting information while reducing the time taken as much as possible. Considering this situation, when transmitting and receiving information by multi-carrier transmission, it is effective to change the method of the estimation of the transmission path in accordance with attributes of the data. Here, as the attribute of the data, the explanation will be made of the method of transmission and reception for changing the method of estimation of the transmission path in accordance with the size of the data to be transmitted and received by one block, taking as an example the size of the data to be transmitted and received.

Figure 3:
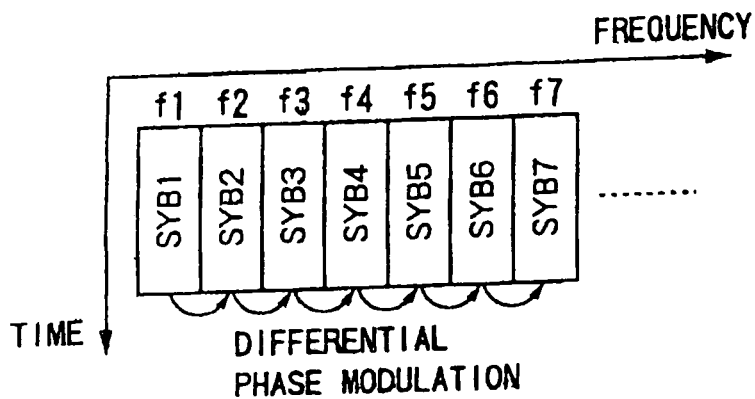
FIG. 3 is a view of differential phase modulation in a frequency direction.

Transmission Path Estimation Method 1:

FIG. 3 schematically represents transmission path estimation method 1 in the transmitting apparatus of the present invention relating to an example of differential modulation. In this example of differential modulation, an example of differential modulation when transmitting the data which can be handled in one modulation period is shown. As illustrated, when transmitting a packet comprised of a small amount of data, for example, when transmitting and receiving only symbols for one modulation period, the transmission path is estimated with reference to the adjoining symbols on the frequency axis to estimate the received symbols. In such a transmission path estimation method, the differential phase modulation is on the frequency axis. Specifically, as illustrated in FIG. 3, when transmitting the symbols SYB1, SYB2, . . . , and SYB7 in the sub-carriers f1, f2, . . . , and f7, respectfully the symbol SYB1 is transmitted as it is as a reference, and a difference between the symbol SYB2 and the symbol SYB1 is made the next transmission symbol. After this, the difference between each of the symbol SYB3 to the symbol SYB7 and the transmission symbol in each previous adjacent sub-carrier is obtained in the same way as with the symbol SYB2, and the differential symbols are transmitted as actual transmission symbols.

By transmitting and receiving the symbols in this way, it becomes possible to transfer information just by transmitting and receiving of one modulation time period's worth of symbols, so communication is possible utilizing less than the normally required bandwidth. In a multi-path environment accompanied with delay, the frequency characteristics do not become flat, but can be considered as approximately flat between two sub-carriers, therefore it is possible to keep deterioration of the characteristics to the lowest limit, even in differential modulation between sub-carriers.

Figure 4:
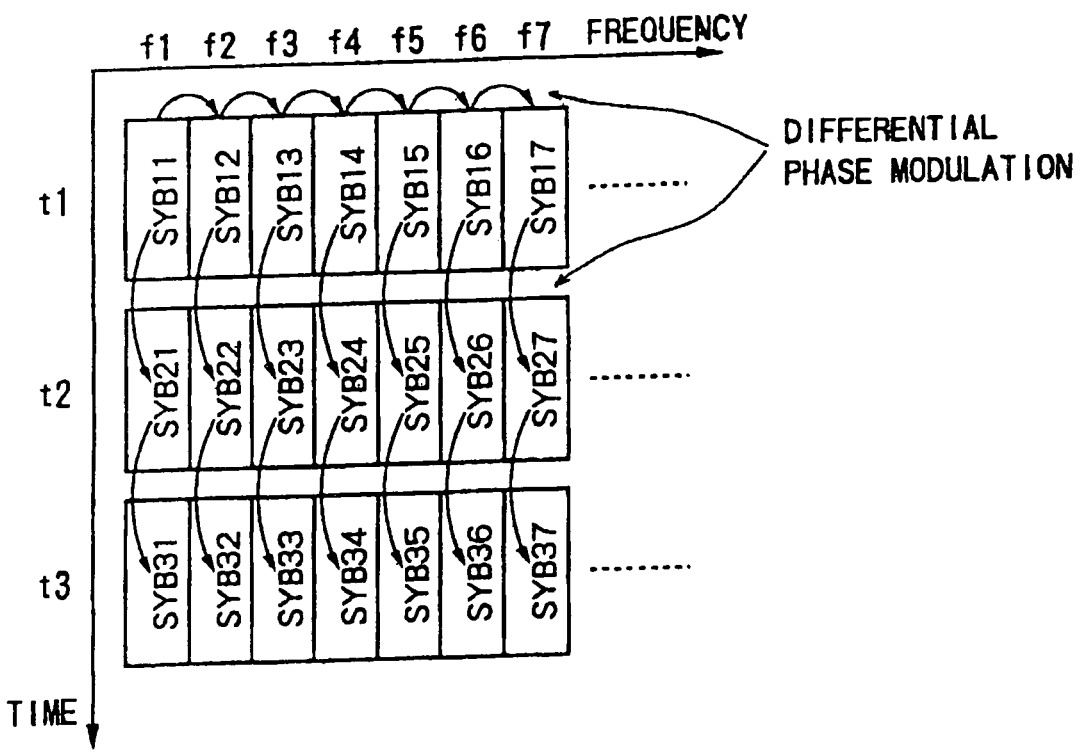
FIG. 4 is a view of differential phase modulation in a time direction.

Transmission Path Estimation Method 2:

FIG. 4 schematically represents another transmission path estimation method in the present embodiment, relative to a differential modulation method when transmitting data that can be handled in several modulation periods. In this case, differential phase modulation is performed in a frequency direction and in a time direction. In the illustrated example, differential phase modulation is performed on the symbols SYB11 to SYB17 transmitted as the first symbol on the time axis with reference to the adjoining symbols on the frequency axis. Namely, in the same way as the example shown in FIG. 3, for example, when transmitting the symbol SYB12, the difference between the symbols SYB12 and SBY11 is transmitted as the actual transmission symbol. The following transmission symbols are then similarly created in accordance with the difference between each of symbols in sub-carriers up to the symbol SYB17 and the symbol in each previous adjacent sub-carrier.

Differential phase modulation is performed on the symbols to be transmitted at the second symbol and the following symbols on the time axis with reference to the adjoining symbols on the time axis. For example, when transmitting the symbols SYB21 to SYB27 in the sub-carriers f1 to f7 at a time t2, the difference between the system SYB21 and the symbol SYB11 of the sub-carrier f1 transmitted at a time t1 is found to create a transmission symbol. In the same way, differential symbols are found for the symbols SYB22 to SYB27 in the sub-carriers from f2 to f7 in accordance with the differences between them and the symbols SYB12 to SYB17 transmitted at the time t1, so as to achieve differential phase modulation.

Similarly, when transmitting the symbols SYB31 to SYB37 in the sub-carriers f1 to f7 at a time t3, differential symbols are found in accordance with differences between them and the symbols SYB21 to SYB27 transmitted at the time t2 so as to achieve differential phase modulation.

When performing differential phase modulation on the symbols to be transmitted by the transmitting apparatus as described above, the receiving apparatus, in response to this, performs differential phase demodulation on the received symbols using a reference symbol received at first for the received symbols, so as to obtain the original transmission symbol.

By transmitting and receiving symbols in this way, it is possible to limit the reference symbols not modulated with information to just the first symbol of the frequency axis/time axis, thus the maximum number of symbols modulated with information can be secured. Further, since the differential phase modulation in the time direction is carried out from the second symbol, even in a propagation environment where the frequency characteristic is relatively vigorous, not only can the communication path be secured well, but also, even in the case where the characteristics of an analog filter are not flat, it becomes possible to keep their influence to the lowest limit. Note that, in FIG. 4, the case of transmitting three symbol's worth of data on the time axis was illustrated, but the number of symbols is not limited to three. Needless to say, the present invention can also be applied to the case of transmitting and receiving more symbols.

Figure 5:
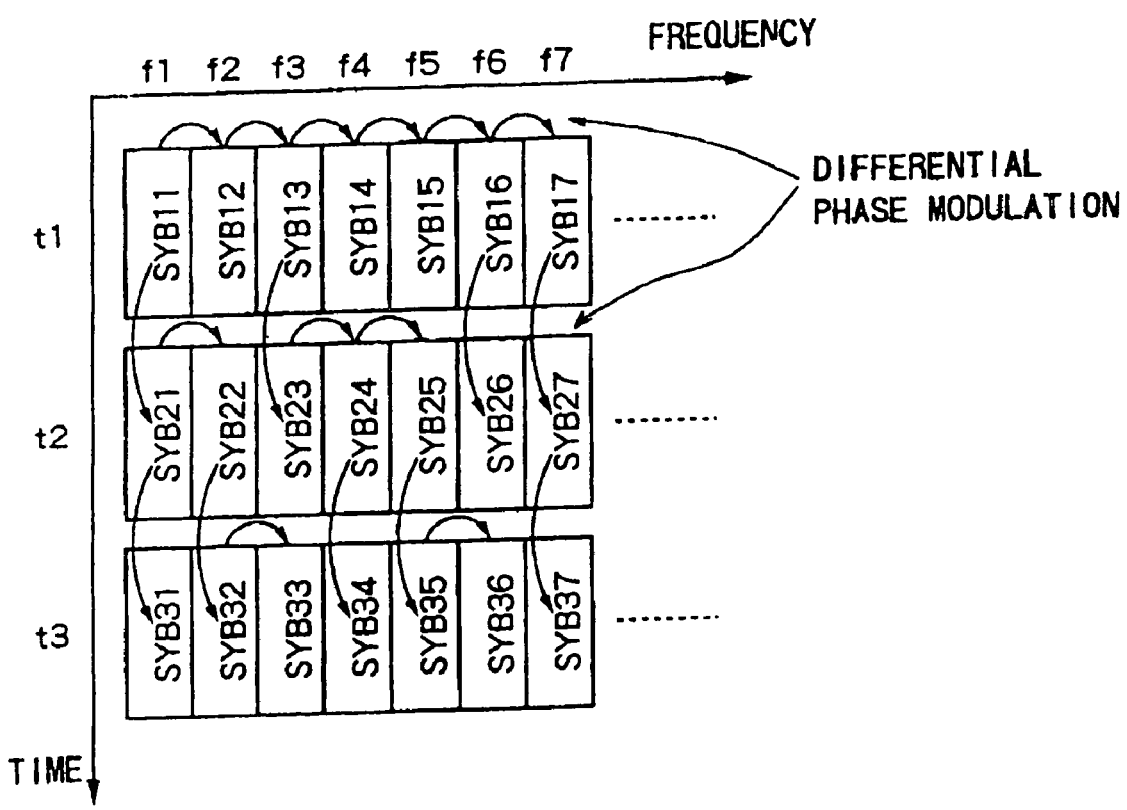
FIG. 5 is a view of differential phase modulation in both of the frequency and time directions.

Transmission Path Estimation Method 3:

FIG. 5 shows another example of differential phase modulation for the case of transmitting data which can be handled in several modulation periods. As illustrated in this example, in substantially the same way as the example shown in FIG. 4, the symbols SYB11, SYB12, . . . , SYB17, SYB21, SYB22, ..., SYB27, SYB31, SYB32, ..., and SYB37 are transmitted at the modulation times t1, t2, and t3 using the sub-carriers f1 to f7.

As shown in FIG. 5, for the second and following symbols on the time axis, it is possible to make the reference symbol any adjoining symbols on the frequency axis/time axis. In this example as well, the number of the reference symbols not modulated with information can be kept to just one symbol.

Specifically, for example, at the time t1, when transmitting the symbols SYB11 to SYB17 in the sub-carriers f1 to f7, the differential phase modulation is performed by finding each difference with reference to the symbol in the adjoining sub-carrier. Then, at the time t2, the phase difference of each symbol is found with reference to the adjoining sub-carrier on the time axis or the frequency axis for differential phase modulation. For example, when transmitting the symbol SYB21, the difference from the adjoining symbol on the time axis, that is, the symbol SYB11 at the time t1, is found so as to create the transmission symbol. When transmitting the symbol SYB22, the difference from the adjoining symbol on the frequency axis, that is, the symbol SYB21 in the sub-carrier f1, is found to produce the transmission symbol. When then transmitting the symbols SYB23 to SYB27, the transmission symbol is created by the difference from each adjoining symbol on the frequency axis or the time axis. Further, similar processing is carried out in the case when transmitting the symbols SYB31 to SYB37 at the time t3.

It should be noted that in the example of the differential phase modulation shown in FIG. 5, when producing a differential symbol, it is necessary to notify the receiving apparatus of the selection pattern of the adjoining symbol acting as the reference symbol. Further, if deciding on the pattern of the related reference symbol in advance as an agreement between the transmitting and receiving apparatuses, transmission of the pattern becomes unnecessary. For example, the pattern of the reference symbol is determined in advance as a communication protocol of the communication system, the transmitting apparatus and the receiving apparatus select the reference symbol by the pattern determined by the protocol at the time of communication, a differential symbol is found with respect to a transmission symbol in the transmitting apparatus in accordance with this, differential phase modulation is carried out, the reference symbol is selected according to the protocol in the receiving apparatus, and the original transmission symbol for the received symbol is reproduced.

In the case shown in FIG. 5, by changing the pattern for setting the reference symbol with respect to each symbol for every communication channel the signal points after the differential phase demodulation in the signals (interference wave) of the other channels no longer have a meaning, therefore, the bit stream after demodulation is judged as error in error detection. Accordingly, data of a different channel as data addressed to the receiving apparatus is no longer erroneously demodulated and it is possible to simultaneously obtain a simple encryption effect.

Figure 6:
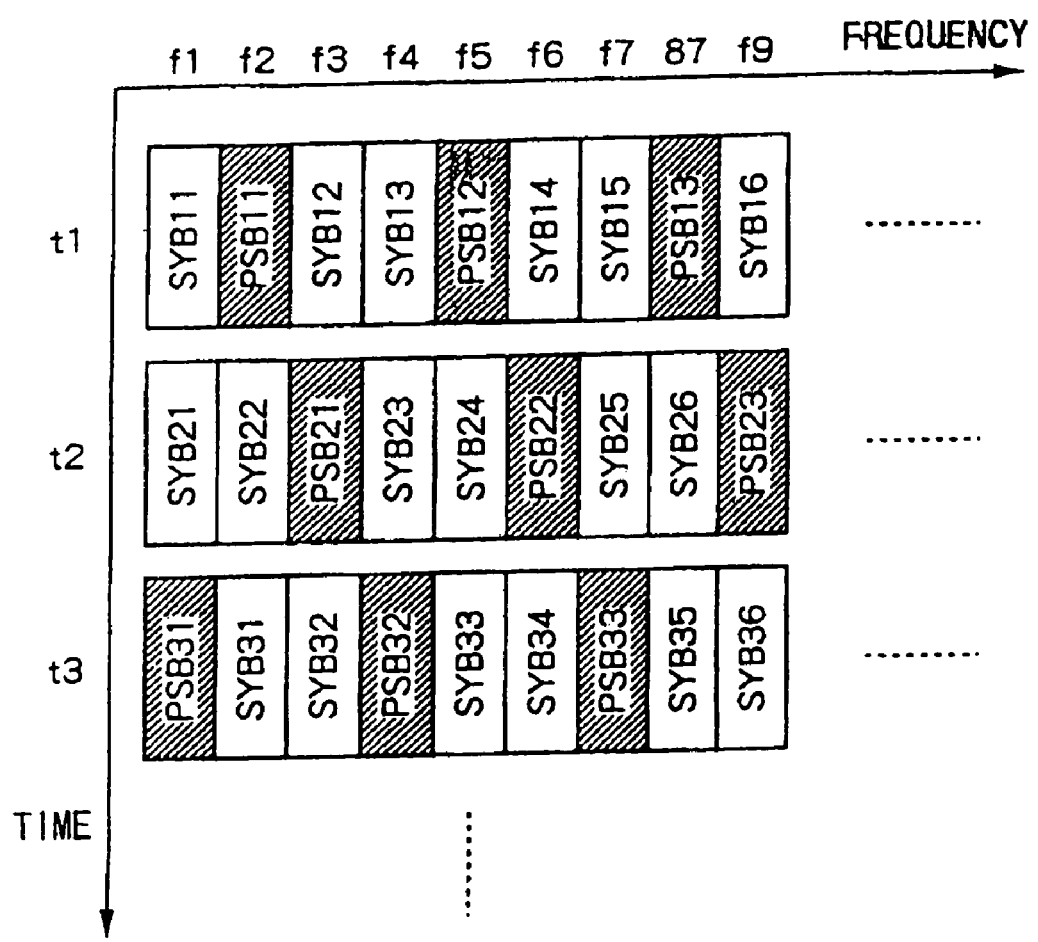
FIG. 6 is a view of a transmission path estimation method by an insertion of pilot symbol.
Figure 7:
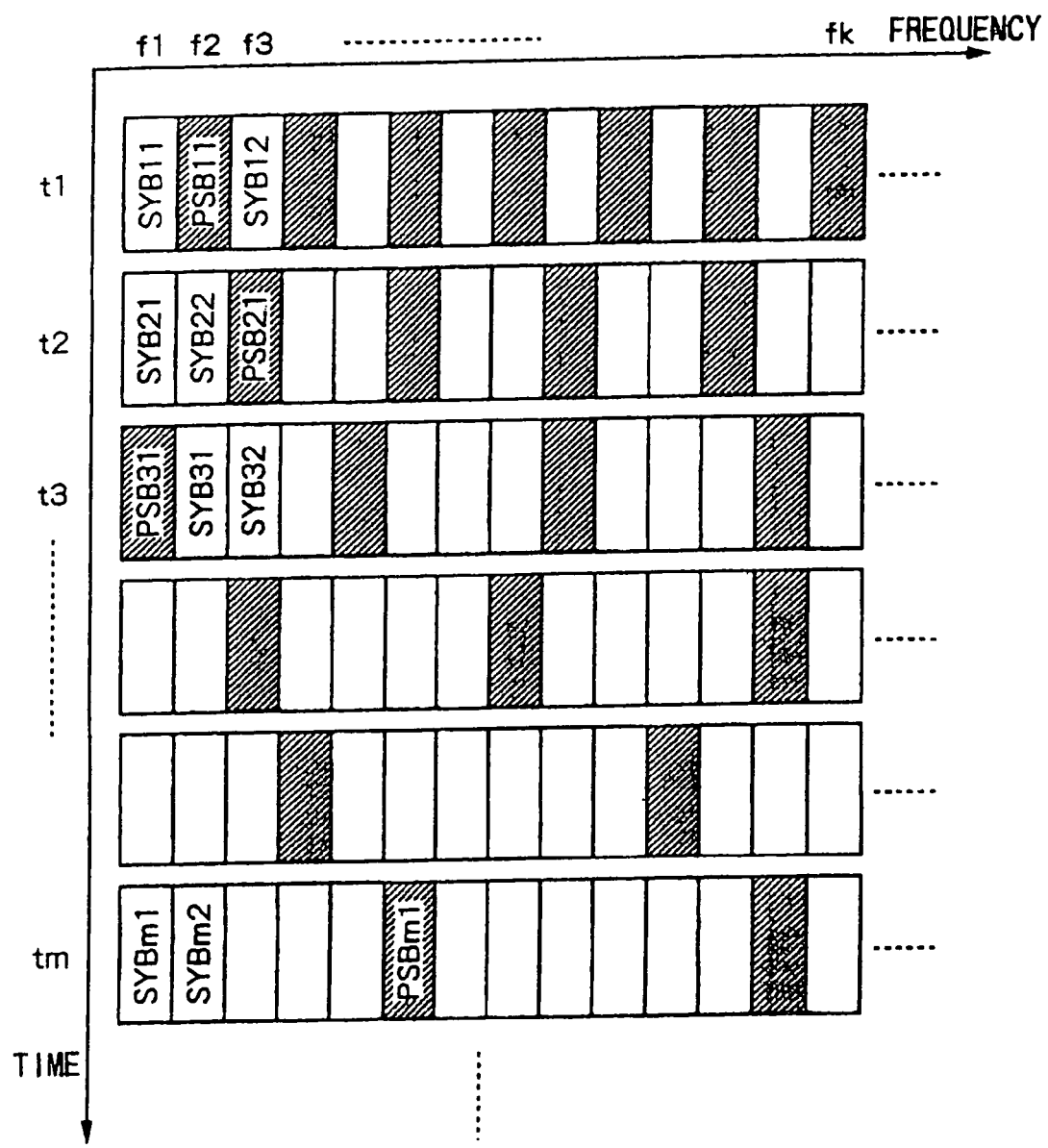
FIG. 7 is a view of a transmission path estimation method making the insertion of the pilot symbol variable at every modulation time.

FIGS. 6 and 7 represent other methods of the estimation of the transmission path. There follows an explanation will be made of these estimation methods of the transmission path by referring to these figures.

When transmitting a large volume of data, symbols for estimating the transmission path are inserted in addition to the symbols modulated with the information data. The data is transmitted together with these symbols. Then, the receiving apparatus finds the phase fluctuation of the transmission path by using the transmission path estimation symbols and corrects the phase error of the symbols modulated with the information data in accordance with that, so as to correctly reproduce the information symbols. Further, the total required Eb/No of the transmission signal can be reduced in comparison with the case where differential phase modulation is carried out.

In the following explanation, the symbols modulated with the information data will be referred to as information symbols and the transmission path estimation symbols will be referred to as pilot symbols for convenience.

Transmission Path Estimation Method 4:

FIG. 6 represents inserting pilot symbols into the information symbols. As illustrated, at the time t1 the information symbol SYB11 is assigned to the sub-carrier f1, and a pilot symbol PSB11 is assigned to the sub-carrier f2. Further, the information symbols SYB12 to SYB16 and pilot symbols PSB12 and PSB13 are assigned to the other sub-carriers f3 to f9.

At the time t2, the information symbols SYB21 to SYB26 and pilot symbols PSB21, PSB22, and PSB23 are assigned to the sub-carriers f1 to f9 and at the time t3, similarly, the information symbols SYB31 to SYB36 and pilot symbols PSB31, PSB32, and PSB33 are assigned to the sub-carriers f1 to f9.

As shown in FIG. 6, the pilot symbols are assigned in a constant ratio with respect to the information symbols. Specifically, one pilot symbol is inserted per two information symbols. Note that the position of insertion of the pilot symbol, that is, the assigned sub-carrier, shifts every modulation period or time. For example, at time t1, the pilot symbol PSB11 is assigned to the sub-carrier f2 and the pilot symbols PSB12 and PSB13 are assigned to the sub-carriers f5 and f8. Contrary to this, at time t2, the pilot symbols PSB21, PSB22, and PSB23 are assigned to the sub-carriers f3, f6 and f9, and, further, time t3, the pilot symbols PSB31, PSB32, and PSB33 are assigned to the sub-carriers f1, f4, and f7.

As explained above, the transmitting apparatus inserts the pilot symbols into the information symbols in a constant ratio. The pilot symbols are inserted in the sub-carrier and the time bands are determined in advance. Ordinary information symbols are assigned to the sub-carriers and the time bands other than those. The receiving apparatus extracts the pilot symbols from among the received symbols, estimates the characteristics of the transmission path in accordance with them, corrects the phase fluctuation etc. of the other information symbols occurring on the transmission path based on them, and therefore correctly reproduces the information symbols. When the data to be transmitted is large in volume, the ratio of the pilot symbols to the number of total information symbols to be transmitted can be lowered, therefore deterioration of the signal due to the differential phase modulation shown in FIG. 3 to FIG. 5 can be avoided and it becomes possible to reduce the total required Eb/No.

Further, when transmitting a large volume of data, there are also cases where it is necessary to transmit a larger amount of data with a narrow frequency bandwidth. In such a case, it is assumed that multi-value modulation such as QAM is applied in place of the usual QPSK modulation. For example, a data modulation method such as 16QAM or 64QAM is frequently used. In these multi-value modulations, information is modulated also in the amplitude component, therefore it is no longer possible to apply the differential phase modulation mentioned above. From this viewpoint as well, when transmitting a large volume of data, it is preferable to use pilot symbols as the transmission path estimation method, rather than differential phase modulation.

In the example shown in FIG. 6, the pilot symbols are always inserted into the information symbols in a constant proportion, but the present invention is not limited to this. There is also a method of estimation of the transmission path by variable pilot symbols, that is, by changing the ratio of assignment of pilot symbols with respect to the information symbols, along with the elapse of the transmission time.

Transmission Path Estimation Method 5:

FIG. 7 represents assigning pilot symbols to the information symbols not by a fixed ratio, but by a ratio changing according to the time elapsed from the start of the transmission. As illustrated, information symbols and pilot symbols are assigned to k sub-carriers f1, f2, f3, . . . , and fk. Further, the assignment ratio of pilot symbols at the modulation times t1, t2, t3, . . . , and tm gradually changes along with the elapse of time from the start of the transmission.

For example, at the modulation time t1, one pilot symbol is inserted for every information symbol. As illustrated, the pilot symbol PSB11 is inserted between the information symbols SYB11 and SYB12. At the next modulation time t2, one pilot symbol is inserted for every two information symbols. For example, the pilot symbol PSB21 is inserted after the information symbols SYB21 and SYB22. Next, at the modulation time t3, one pilot symbol is inserted for every three information symbols.

In this way, along with the elapse of time after the start of the data transmission, the number of pilot symbols to be assigned to the information symbols is gradually lowered. Namely, immediately after the start of the transmission, the characteristics of the transmission path are completely unknown, therefore the pilot symbols are inserted in the information symbols at a high ratio. Contrary to this, the receiving apparatus can extract the pilot symbols from among the received symbols and quickly estimate the characteristics of the transmission path and can correct the error with respect to the information symbols. Then, after a constant time elapses after the start of the transmission, the characteristics of the transmission path are stored to a certain extent by the estimation of the transmission path up to then. As a result, the change of the characteristics of the transmission path can be tracked by just a few pilot symbols. It therefore becomes possible to accurately correct the received information symbols.

When the transmission path is fixed, for example, when the positions of the transmitting apparatus and the receiving apparatus are fixed and the propagation path of the radio wave is almost constant between them, the characteristics of the transmission path become almost constant. When the predetermined time elapses after the start of the transmission, the receiving apparatus can fairly completely determine the characteristics of the transmission path. In this case, it is not necessary to insert pilot symbols into the transmitting signal, so when the predetermined time elapses after the start of the transmission, the insertion of the pilot symbol is ceased. Then, the receiving apparatus estimates and stores the characteristics of the transmission paths by the pilot symbols received after the start of the transmission. After the transmission of the pilot symbol is ceased, errors of the received symbols are corrected by using the characteristics of the transmission paths estimated up to then, so as to reproduce the original information symbols.

On the other hand, where the transmission path is not fixed, for example, in the case of mobile telecommunications, the position of the receiving apparatus changes every moment and the characteristics of the transmission path between the transmitting apparatus and the receiving apparatus constantly change. Therefore, it is necessary to continuously estimate the transmission path. In this case, it is necessary to continuously transmit the pilot symbols even after the constant time elapses after the start of the data transmission. Note that after the constant time elapses after the start of the data transmission, in accordance with the state of the transmission path, the ratio of assignment of the pilot symbols can be set lower in comparison with that immediately after the start of the data transmission. At this time, the receiving apparatus may receive successively transmitted pilot symbols and add the change of the newly estimated characteristic to the characteristics of the transmission path stored up to then to correct them. Then, the apparatus corrects errors of the received information symbol in accordance with the characteristics of the transmission path to reproduce the original information symbols.

According to the method of estimation of the information path by pilot symbols of the present invention since pilot symbols are inserted into the information symbols at a high ratio immediately after the start of the data transmission and the assignment ratio of the pilot symbols is gradually reduced along with the elapse of time, a high quality of transmission is obtained immediately after the start of communication. At the same time, the ratio of the pilot symbols to the information symbols to be transmitted is gradually lowered, the efficiency of the information transmission is gradually raised, and thus effective utilization of the frequency band can be achieved.

As explained above, according to the present embodiment, by changing the method of estimation of the transmission path and the modulation method in accordance with an attribute of the data to be transmitted, for example, the size of the packet to be transmitted, it is possible to constantly use the optimum transmission method when transmitting packets having different sizes and thereby improve the transmission efficiency and enhance the quality of communication.

Next, a detailed explanation will be given of the configuration and the operation of each principal circuit portion configuring the transmitting and receiving apparatus for realizing the transmission path estimation method of the present embodiment by referring to the circuit diagrams.

First, an explanation will be made of the data modulation method used in the communication system of the present embodiment by referring to FIG. 8 and FIG. 9. Here, the explanation will be made with reference to the two QPSK and 16QAM data modulation methods frequently used in multi-carrier communication.

Figure 8:
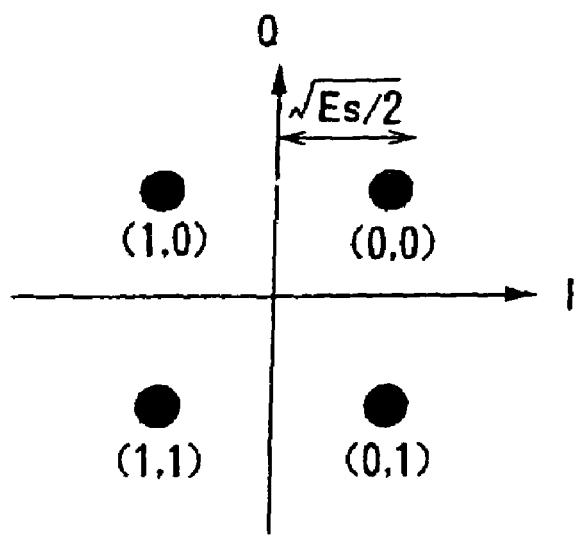
FIG. 8 is a view of signal distribution of a QPSK modulated signals.

FIG. 8 is a view of the signal distribution showing the QPSK modulation method. Note that this signal distribution diagram is also referred to as a constellation. In QPSK modulation, the modulation is performed by two bits of data in one sub-carrier. For this reason, as shown in FIG. 8, a modulated signal has four distributions. These correspond to (0, 0), (0, 1), (1, 0), and (1, 1) of the modulated data. In a modulated signal obtained by the QPSK modulation, the interval between distribution points of the signals is large, that is, the Hamming distance of the modulated signal is large, therefore the error rate due to the noise of the transmission path is low and the noise tolerance is good. In this modulation method, however, the rate of utilization of the frequency band is low, therefore this method is usually applied to an environment where the size of the data is relatively small and the influence of the noise in the transmission path is strong.

Figure 9:
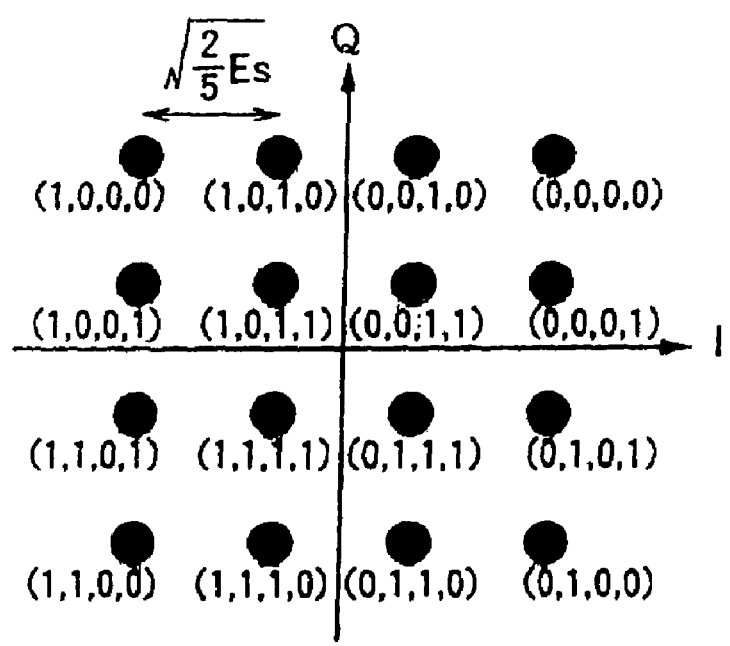
FIG. 9 is a view of signal distribution of a 16QAM modulated signal.

FIG. 9 is a signal distribution diagram of the 16QAM modulation method. As shown in FIG. 9, in 16QAM modulation, a signal is modulated by 4 bits of data in one sub-carrier. In the modulated signal, not only the phase, but also the amplitude are modulated. As shown in the signal distribution diagram of FIG. 9, in a signal modulated by the 16QAM modulation method, the interval of the distribution points of the signal is smaller than that of a QPSK modulated signal, so the rate of occurrence of error due to the noise of the transmission path becomes higher. Namely, the noise tolerance is inferior to the QPSK modulation method. In the 16QAM modulation method, however, the rate of utilization of the frequency band is high, therefore when transmitting a large volume of data, a multi-value modulation method such as 16QAM is applied. In this case, in order to improve the tolerance to noise, powerful encoding is applied so as to enable communication even under a low SNR environment. Further, it is also possible to enhance the tolerance to noise by setting the maximum output power of the transmitter high within the permissible range of the transmission power of the transmitter.

Although only the two modulation methods of QPSK and 16QAM were exemplified above, the present invention is not limited to these modulation methods, and it is also possible to use a modulation method such as 8PSK or 64QAM other than them.

In the transmission path estimation method of the first embodiment of the present invention, for example, when using differential phase modulation, that is, in the method of finding the difference of symbols adjoining on the time axis or frequency axis to create a transmission symbol, by producing a reference symbol using QPSK modulation and transmitting the same when transmitting a reference symbol first when starting the data transmission, the reference symbol can be highly precisely demodulated at the reception side. Therefore, the original transmission symbols can be reproduced in accordance with multi-function differential symbols using this. When inserting pilot symbols between the information symbols and estimating the transmission path by the related pilot symbols, the pilot symbols can be created and transmitted by the 16QAM modulation method. In this case, due to the precision of the estimation of the transmission path, the deterioration of the 16QAM noise tolerance can be absorbed to a certain extent.

Figure 10:
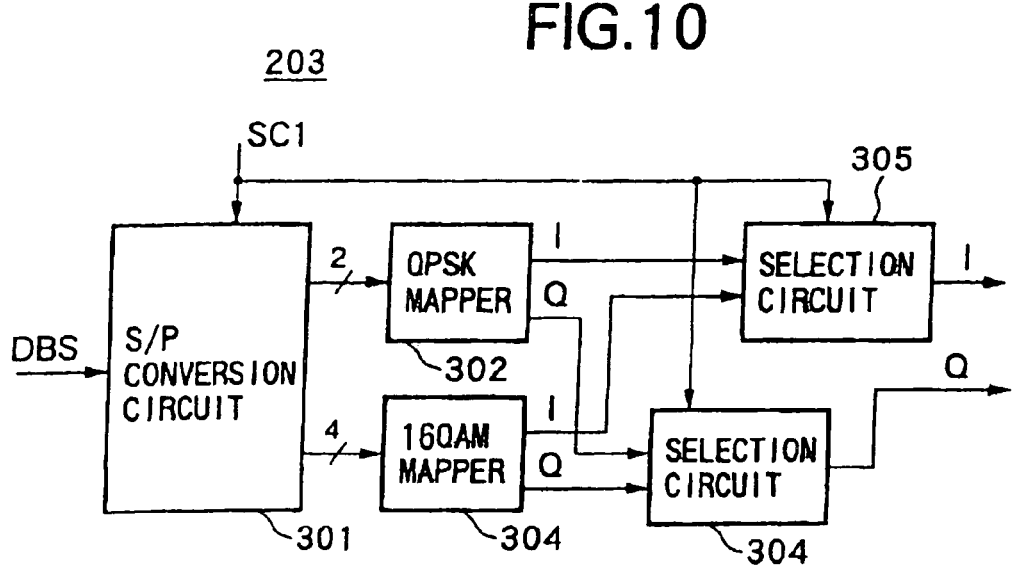
FIG. 10 is a block diagram of an example of the configuration of a mapping circuit.

Next, an explanation will be given of the circuit configuration and the operation of the symbol mapping circuit 203 and the differential modulation/pilot addition circuit 204 of the transmitting apparatus in the present embodiment. FIG. 10 is a block diagram of an example of the configuration of the symbol mapping circuit 203. Note that either the QPSK or 16QAM modulation method can be applied to the symbol mapping circuit 203 of the present example. As illustrated, the symbol mapping circuit 203 is configured by a serial/parallel conversion circuit (S/P conversion circuit) 301, a QPSK mapper 302, a 16QAM mapper 303, and selection circuits 304 and 305. The input bit stream DBS is converted to parallel data by the serial/parallel conversion circuit 301. Note that, here, the number of bits of the serial/parallel conversion is set in accordance with the modulation method. For example, when using the QPSK modulation method, the bit stream DBS is converted to parallel data and supplied to the QPSK mapper 302 two bits at a time, while when using the 16QAM modulation method, the bit stream DBS is converted to parallel data and supplied to the 16QAM mapper 303 four bits at a time. As illustrated, a control signal SC from the outside is input to the serial/parallel conversion circuit 301. The serial/parallel conversion circuit 301 selects either 2-bit or 4-bit conversion in accordance with the related control signal SC and outputs the obtained parallel 2-bit or 4-bit data to either of the QPSK mapper 302 or the 16QAM mapper 303.

The QPSK mapper 302 maps the input data to create a QPSK modulated signal having the I-Q data distribution in FIG. 8 corresponding to the combination of the input two bits of data. On the other hand, the 16QAM mapper 303 maps the input data to create a 16QAM modulated signal having the I-Q data distribution in FIG. 9 corresponding to the combination of the input four bits of data. The selection circuits 304 and 305 select either the output signal of the 16QAM mapper 303 or the QPSK mapper 302 in response to the control signal SC and output the same.

Due to the mapping circuit 203 having the above configuration, the input bit stream DBS is modulated by either of the QPSK modulation or 16QAM modulation according to the intended modulation method, and the orthogonal signals I and Q in the modulated signal are output.

Figure 11:
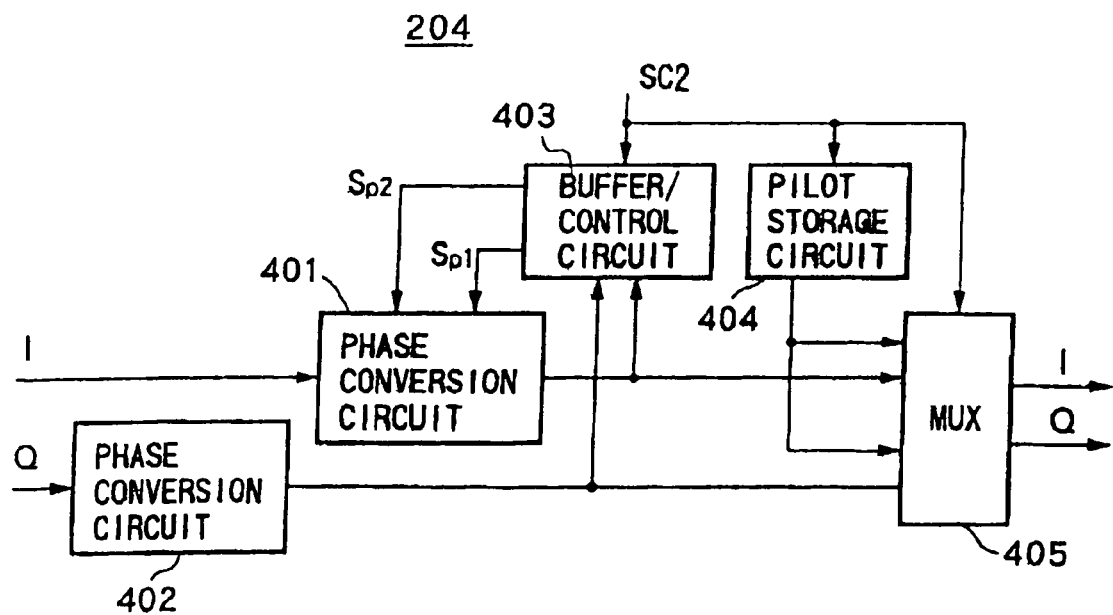
FIG. 11 is a block diagram of an example of a differential phase modulation/pilot addition circuit.

FIG. 11 is a block diagram of an example of the configuration of the differential modulation/pilot addition circuit 204. As illustrated, the differential modulation/pilot addition circuit 204 is configured by phase conversion circuits 401 and 402, a buffer/control circuit 403, a pilot storage circuit 404, and a multiprocessor (MUX) 405. The phase conversion circuits 401 and 402 rotate the phase of each of the input I-signal and Q-signal in response to control signals Sp1 and Sp2 from the buffer/control circuit 403. This processing is used when the phase conversion circuits 401 and 402 perform the differential phase modulation. By changing the phase of the signal in accordance with the phase value of the adjoining symbol at the time of the differential phase modulation, differential phase modulation of the QPSK signal is carried out. The I-signal and the Q-signal, differentially phase modulated by the phase conversion circuits 401 and 402, are input to the buffer/control circuit 403 and the multiprocessor 405. The I-signal and the Q-signal are stored in a buffer of the buffer/control circuit 403 and used as adjoining symbols at the next differential phase modulation.

Note that in differential phase modulation in the frequency axis direction, the symbol input one position before becomes the adjoining symbol, while in differential phase modulation in the time axis direction, the symbol at the same position transmitted one modulation time before becomes the adjoining symbol. The control circuit in the buffer/control circuit 403 decides whether to apply differential phase modulation in the frequency direction to the input symbol or differential phase modulation in the time direction in accordance with the control signal SC2 from the outside and controls how the phase conversion circuits 401 and 402 rotate the phases in accordance with the result. The phases in the phase conversion circuits 401 and 402 are rotated by a signal point mapper to eight points. Namely, the same operation as that of the ordinary differential QPSK (DQPSK) modulator is carried out. In differential phase modulation, the I-signal and the Q-signal input to the multiprocessor 405 are output to the outside as a transmission symbol train as they are.

The pilot storage circuit 404 is used when inserting the symbols for estimating the transmission path. In this case, the I- and Q-signals input to the phase conversion circuits 401 and 402 are not phase modulated, but pass through these phase modulation circuits as they are and are input to the multiprocessor 405 and stored in the buffer provided inside the multi-processor 405. The pilot storage circuit 404 is instructed as to the insertion position of the symbol for estimating the transmission path by the control signal SC2 from the outside, and therefore outputs the pilot symbols stored in the multiprocessor 405 according to the related control signal SC2.

The multiprocessor 405 inserts the pilot symbols into insertion positions according to the instructions when the insertion positions of the symbols for estimating the transmission path are instructed by the control signal SC2 from the outside. It outputs the input symbols to positions other than this.

Due to the differential modulation/pilot addition circuit 204 configured as described above, either differential phase modulation or pilot symbol insertion is executed in response to the control signal SC2 from the outside. In differential phase modulation, the phases of the input I- and Q-signals are rotated by the phase conversion circuits 401 and 402 in response to the control signals Sp1 and Sp2 from the buffer/control circuit 403. Further, the phase-modulated I- and Q-signals are stored in the buffer and used as the adjoining symbols at the next differential phase modulation. When adding transmission path estimation pilot symbols, the input I- and Q-signals are input to the multiprocessor 405 through the phase conversion circuits 401 and 402. The multiprocessor 405 inserts the pilot symbols stored in the pilot storage circuit 404 into the positions indicated by the control signal SC2 and outputs them to the outside. Symbols to be input into positions other than this are output.

In the transmitting apparatus, the mapping circuit 203 and the differential modulation/pilot addition circuit 204 modulate the input bit stream DBS by the intended modulation method, for example QPSK or 16QAM. In differential phase modulation, the phases of the I- and Q-signals of the transmission symbols are rotated with reference to the adjoining symbols for differential phase modulation. On the other hand, when adding transmission path estimation pilot symbols, the pilot symbols are inserted into predetermined positions of the transmission symbols input. The transmitting apparatus including these partial circuits maps the input bit stream DBS according to a predetermined modulation method and creates the orthogonal I-signal and Q-signal. Further, it performs differential phase modulation on these orthogonal signals or inserts transmission path estimation pilot symbols and outputs the obtained symbol stream comprised of the I-signal and Q-signal. The symbol stream obtained in this way is randomized by an orthogonal transform according to need and then multiplexed with symbol streams of other channels, and the transmission waveform is found by the inverse Fourier transform and modulated to a high transmission frequency and transmitted by the transmission circuit.

Next, an explanation will be given of the configurations and the operations of the transmission path estimation circuit 214 and the bit extraction circuit 213 as the principal portions configuring the receiving apparatus shown in FIG. 2.

Figure 12:
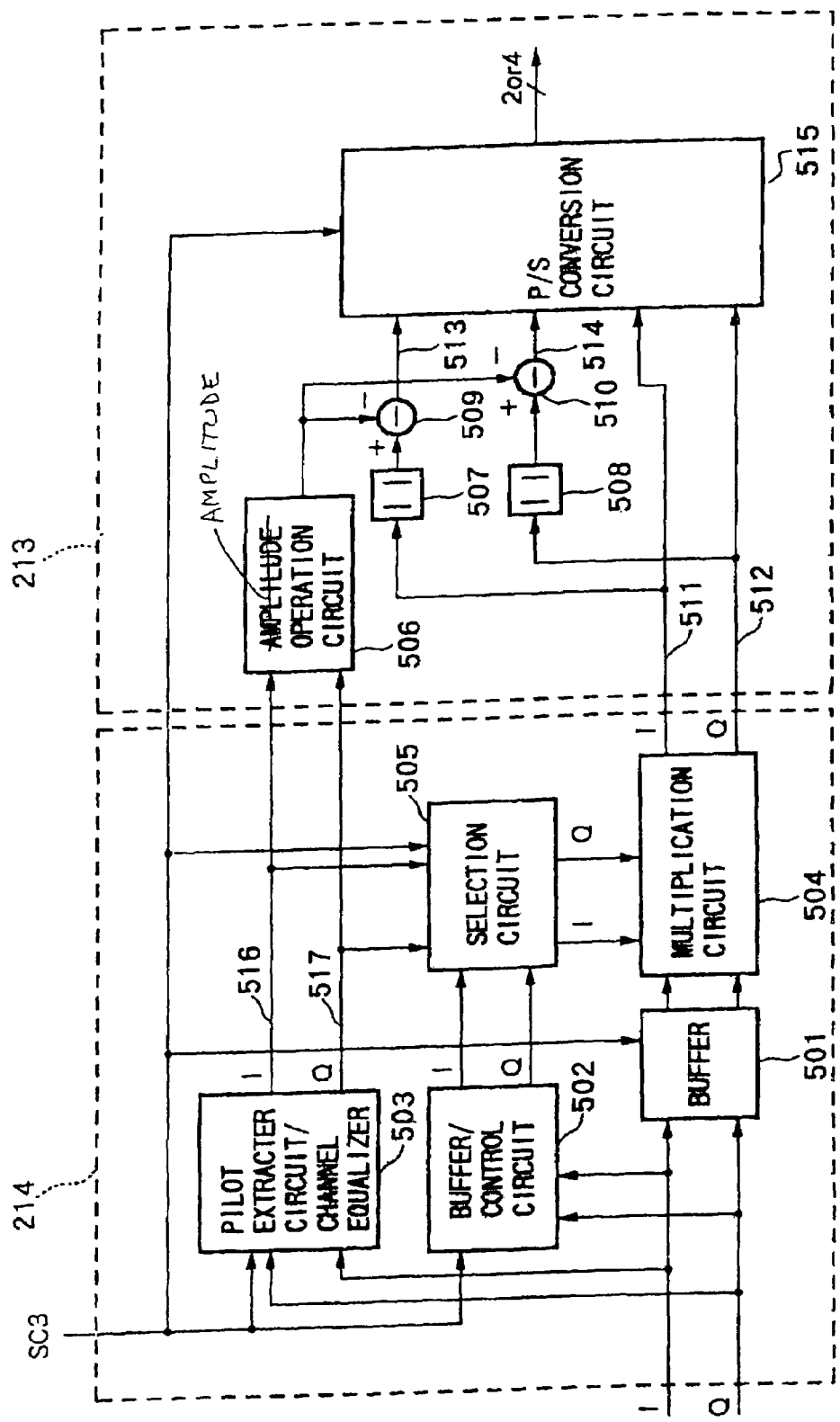
FIG. 12 is a block diagram of an example of a transmission path estimation circuit and a bit extraction circuit.

FIG. 12 is a circuit diagram of an example of the configuration of the transmission path estimation circuit 214 and the bit extraction circuit 213. As shown, the transmission path estimation circuit 214 is configured by a buffer 501, a buffer/control circuit 502, a pilot extraction circuit/channel equalizer 503, a multiplication circuit 504, and a selection circuit 505. The transmission path estimation circuit 214 and the bit extraction circuit 213 shown in FIG. 12 can be used for three types of transmission path estimation methods, that is, differential phase modulation in the frequency direction, differential phase modulation in the time direction, and use of pilot symbols for estimating the transmission path and can be used with either the QPSK or 16QAM modulation method.

First, an explanation will be given of the transmission path estimation circuit 214. The transmission path estimation circuit 314 is instructed by the control signal SC3 input from the outside as to what transmission path estimation method to use to estimate the transmission path. The control signal SC3 is input to the buffer 501, buffer/control circuit 502, pilot extraction circuit/channel equalizer 503, and selection circuit 505.

The buffer 501 passes input symbols comprised of the input I-signal and Q-signal as they are when the received symbols are differentially phase modulated. On the other hand, it stores the input symbols until the estimation of the transmission path is terminated when pilot symbols are inserted into the input symbols, this is hereinafter referred to as coherent detection.

The buffer/control circuit 502 stores the related input symbols and outputs the symbols stored in it when differentially phase modulating the input symbols. The output symbol is determined according to whether a symbol adjoining on the time axis is used as a reference or a symbol adjoining on the frequency axis is used as a reference. Note that in the case of coherent detection, the related buffer/control circuit 502 does not operate.

The pilot extraction circuit/channel equalizer 503 does not operate in the case of differential phase modulation. In the case of coherent detection, only the pilot symbols for estimating the transmission path are extracted from the input symbol stream, the transmission path is estimated in accordance with this, and an I-signal and the Q-signal indicating a vector on the I-Q plane corresponding to the transfer characteristic of the estimated transmission path are output to signal lines 516 and 517.

The selection circuit 505 outputs the output symbol from the buffer/control circuit 502 in the case of differential phase modulation, and it outputs an I-signal and the Q-signal comprising the vector output from the pilot extraction circuit/channel equalizer 503 in the case of coherent detection. Note that in both cases, the input I-signal or Q-signal which is obtained by inverting the sign of the Q-signal (conjugate) is the output of the selection circuit 505.

In the operation of the transmission path estimation circuit 214, the I-signal and the Q-signal input to the transmission path estimation circuit 214 are input to the buffer 501 and input to the buffer/control circuit 502 and the pilot extraction circuit/channel equalizer 503. In the case of coherent detection, the I-signal and the Q-signal input vector, that is, the result of estimation of the transmission path, is output from the pilot extraction circuit/channel equalizer 503 and the I-signal and Q-signal input are held by the buffer 501.

When the transmission path estimation method used is differential phase modulation in the frequency direction, the I-signal and the Q-signal input to the buffer/control circuit 502 are input via the selection circuit 505 to the multiplication circuit 504 after a one symbol time delay. The multiplication circuit 504 performs complex number multiplication of the symbol input from the selection circuit 505 and the symbol input from the buffer 501 and outputs the Q-signal 512 and the I-signal 511 as the result of multiplication.

When the transmission path estimation method used is differential phase modulation in the time direction, the I-signal and the Q-signal of the input symbols pass through the buffer 501 and are input to the multiplication circuit 504.

Further, the symbol at the same position received one modulation time before and output from the buffer/control circuit 502 is input via the selection circuit 505 to the multiplication circuit 504. The multiplication circuit 504 performs complex number multiplication of the input symbols and outputs the I-signal and the Q-signal, that is, the results of the multiplication, to the signal lines 511 and 512. Further, the buffer/control circuit 502 stores the input symbols and holds them until the next modulation time as the reference symbols for the next modulation time.

In differential phase modulation in which differential phase modulations in the frequency direction and the time direction are mixed, the buffer/control circuit 502 judges by the information obtained from the input control signal SC3 in which of the frequency direction or time direction the symbols input to the buffer 501 at the present should be differentially phase demodulated and outputs the corresponding symbol among the symbols stored inside the buffer/control circuit 502 as the reference symbol. The output symbol is input through the selection circuit 505 to the multiplication circuit 504 and is multiplied with the input symbol, and the Q-signal 512 and the I-signal 511 are output as the result of multiplication.

In coherent detection, the input symbols are stored by the buffer 501. Simultaneously with this, only the pilot symbols for estimating the transmission path in the symbol stream input to the pilot extraction circuit/channel equalizer 503 are extracted and stored. Next, the pilot extraction circuit/channel equalizer 503 estimates the transmission path in accordance with the pilot symbols and outputs the I-signal and the Q-signal comprising the vector on the I-Q plane of an amplitude that is the square root of $(ES)^{1/2}$ having a mean reception power per symbol corresponding to the estimated transmission path. Simultaneously with the inputting of the vector to the selection circuit 505, the vector is also supplied to the bit extraction circuit 213.

Simultaneously with the pilot extraction circuit/channel equalizer 503 outputting the vector on the I-Q plane corresponding to the transfer characteristic of the transmission path, the received symbol stored in the buffer 501 is output to the multiplication circuit 504. The multiplication circuit 504 multiplies the received symbol input from the buffer 501 and the vector obtained by the estimation of the transmission path and outputs the result of the multiplication, that is, the Q-signal line 512 and the I-signal line 511.

The transmission path estimation circuit 214 having the above configuration estimates the transmission path for the input received symbol and outputs the symbol with the error occurring on the transmission path having been corrected. Further, the transmission path estimation circuit 214 of the present example can handle all of the differential phase modulation in the frequency direction, differential phase modulation in the time direction, mixed differential phase modulation in the frequency direction and the time direction, and coherent detection. A pair of orthogonal signals, the I-signal and the Q-signal, is obtained from the symbol with the error occurring on the transmission path corrected, and output to the signal lines 511 and 512.

As shown in FIG. 12, the bit extraction circuit 213 is configured by an amplitude operation circuit 506, absolute value operation circuits 507 and 508, subtraction circuits 509 and 510, and a parallel/serial conversion circuit (P/S conversion circuit) 515. Note that the related bit extraction circuit 213 corresponds to the QPSK and 16QAM modulation methods.

The I-signal and the Q-signal output by the transmission path estimation circuit 214 are input through the signal lines 511 and 512 to the parallel/serial conversion circuit 515 and input to the absolute value operation circuits 507 and 508. Further, the vector on the I-Q plane corresponding to the transfer characteristic of the transmission path obtained by the pilot extraction circuit/channel equalizer 503 is input via the signal lines 516 and 517 to the amplitude operation circuit 506.

The amplitude operation circuit 506 finds the amplitude corresponding to the input vector. Specifically, where the received symbol is 16QAM modulated, the amplitude operation circuit 506 calculates the absolute value of the amplitude of the related vector by the values of the I-signal and the Q-signal indicating the input vector and outputs a value obtained by multiplying the absolute value of the calculated amplitude by the square root of (⅖).

The absolute value operation circuits 507 and 508 find the absolute values of the I-signal and the Q-signal input via the signal lines 511 and 512.

The subtraction circuit 509 subtracts the output of the absolute value operation circuit 507 and the output of the amplitude operation circuit 506 and supplies the result of subtraction via a signal line 513 to the parallel/serial conversion circuit 515.

The subtraction circuit 510 subtracts the output of the absolute value operation circuit 508 and the output of the amplitude operation circuit 506 and supplies the result of the subtraction via a signal line 514 to the parallel/serial conversion circuit 515.

Below, an explanation is provided of the operation of the bit extraction circuit 213 having the above configuration for the cases where the received symbols are QPSK modulated or 16QAM modulated.

When the received symbols are QPSK modulated, the amplitude operation circuit 506, the absolute value operation circuits 507 and 508, and the subtraction circuits 509 and 510 do not operate. In this case, only the parallel/serial conversion circuit 515 operates. The parallel/serial conversion circuit 515 sequentially outputs two bits of data with respect to one input symbol by using the I-signal and the Q-signal input via the signal lines 511 and 512 as soft judgment values at the first bit and the second bit.

On the other hand, when the received symbols are 16QAM modulated, first, the amplitude operation circuit 506 calculates the square value of the amplitude of the vector based on the I- and Q-signals input from the signal lines 516 and 517, calculates the value obtained by multiplying the absolute value of the calculated amplitude by the square root of (⅖), and outputs the results to the subtraction circuits 509 and 510. An I-component of a received symbol input from the signal line 511 is input to the absolute value operation circuit 507, and a Q-component of the received symbol input from the signal line 512 is input to the absolute value operation circuit 508. The absolute value operation circuits 507 and 508 calculate the absolute values of the input I-component and Q-component, then the subtraction circuits 509 and 510 subtract them from the amplitude value calculated by the amplitude operation circuit 506. The results of the subtraction are supplied through the signal lines 513 and 514 to the parallel/serial conversion circuit 515. The parallel/serial conversion circuit 515 outputs the I-component and the Q-component of the received symbol input from the signal lines 511 and 512 as the first bit and second bit soft judgment values and outputs the results of the subtraction input from the signal lines 513 and 514 as the third bit and fourth bit soft judgment values.

FIG. 1

As explained above, the bit extraction circuit 213 of the present example outputs the received data from the received symbols in accordance with the I-component and the Q-component of the input received symbols and the I-component and the Q-component of the vector found by the estimation of the transmission path. Further, the related bit extraction circuit 213 can handle the case where the received symbol is modulated by either the QPSK modulation or the 16QAM modulation method. It extracts two bits or four bits of the received data corresponding to the received symbols modulated by the modulation methods.

Below, an explanation is provided of the estimation of the transfer characteristic of the transmission path in the pilot extraction circuit/channel equalizer 503 shown in FIG. 1.

Figure 13:
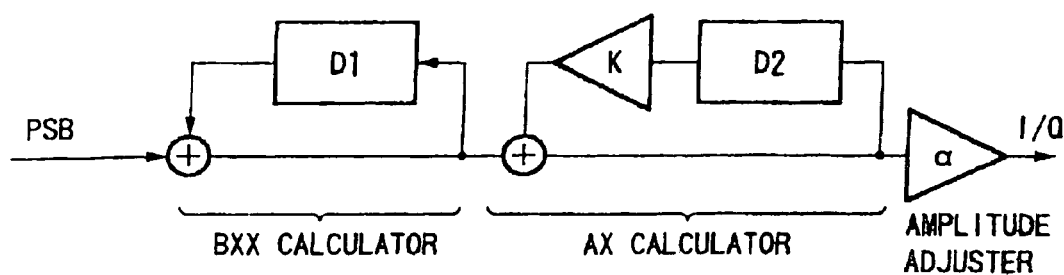
FIG. 13 is a block diagram of an example of the configuration of a channel equalizer.

The transfer characteristic of the transmission path is estimated by statistically processing a plurality of pilot symbols extracted from the received symbols. FIG. 13 shows an example of an equivalent circuit of the channel equalizer, in which the channel equalizer is configured by a Bxx calculator, an Ax calculator, and an amplitude adjuster, estimates the transfer characteristic of the transmission path by storing extracted pilot symbols PSB in the frequency direction and the time direction, and outputs a vector I/Q corresponding to the transfer characteristic.

Figure 14:
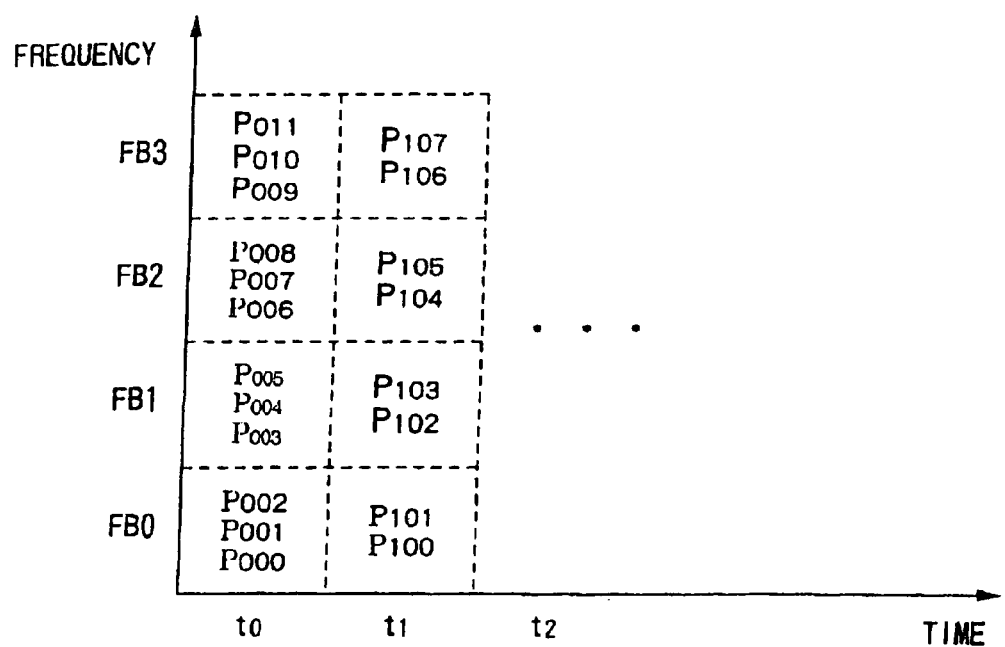
FIG. 14 is a view of a transmission path estimation method in a channel equalizer.

FIG. 14 shows a specific example of the processing for the estimation of the transmission path, wherein the frequency band is divided into a plurality of frequency blocks FB0, FB1, FB2 and FB3. Each block, contains a predetermined number of OFDM sub-carriers. For example, in the distribution diagram of transmission symbols shown in FIG. 7, the frequency band is divided so that one block corresponds to six sub-carriers.

The blocks FB0 to FB3 divided in this way each contain a plurality of pilot symbols. For example, at a modulation time t0, pilot symbols P000, P001, and P002 are contained in the block FB0, pilot symbols P003, P004, and P005 are contained in the block FB1, pilot symbols P006, P007, and P008 are contained in the block FB2, and further pilot symbols P009, P010, and P011 are contained in the block FB3.

Here, the transmission path is estimated assuming that the transmission characteristics of the transmission path substantially match in the sub-carriers in the blocks.

First, the transfer functions B01, B02, B03, and B04 in the blocks are calculated. At the modulation time t0, in the block FB0, a transfer function B00 is found as follows:

$$B_{00} = \text{SUM from } \{i=0\} \text{ to } 3\ P_{00i} \quad (1)$$

Here, $P_{00i}$ means addition of the vectors of the pilot symbols. Namely, the I-components and the Q-components of the pilot symbols are added to calculate the transfer function. Next, in the block FB1, the transfer function B01 is found as follows.

$$B_{01} = \text{SUM from } \{i=2\} \text{ to } 6\ P_{00i} \quad (2)$$

Similarly, in the blocks FB2 and FB3, the transfer functions B02 and B03 are found as follows:

$$B_{02} = \text{SUM from } \{i=5\} \text{ to } 9\ P_{00i} \quad (3)$$

$$B_{03} = \text{SUM from } \{i=8\} \text{ to } \{11\}\ P_{00i} \quad (4)$$

As explained above, the transfer functions B00 to B03 of the blocks are calculated by addition of one pilot symbol existing in an adjoining next block in addition to the pilot symbols in the blocks.

Next, at the modulation time t1, as shown in FIG. 14, pilot symbols P100 and P101 are contained in the block FB0, pilot symbols P102 and P103 are contained in the block FB1, pilot symbols P104 and P105 are contained in the block FB2, and pilot symbols P106 and P106 are contained in the block FB3.

Here, at the modulation time t1, the transfer functions B10, B11, B12, and B13 in the blocks are calculated. At the modulation time t1, in the block FB0, the transfer function B10 is founds follows.

$$B_{10} = \text{SUM from } \{i=0\} \text{ to } 2\ P_{10i} \quad (5)$$

Similarly, in the blocks FB1 to FB3, the transfer functions B11 to B13 are found as follows.

$$B_{11} = \text{SUM from } \{i=1\} \text{ to } 4\ P_{10i} \quad (6)$$

$$B_{12} = \text{SUM from } \{i=3\} \text{ to } 6\ P_{10i} \quad (7)$$

$$B_{13} = \text{SUM from } \{i=5\} \text{ to } 7\ P_{10i} \quad (8)$$

As explained above, at the modulation times t0 and t1, the transfer functions B00 to B03 and B10 to B13 are calculated. In the case of the time t0 (at the first symbol after the start of the transmission), the value of B0x (x=0, 1, 2, 3) is adjusted in amplitude by α and then becomes the value of Ax as it is.

Then, at the time t1, the transmission path vectors A0, A1, A2, and A3 in the blocks are calculated based on the transfer functions calculated at the time t0 and t1.

The transmission path vector A0 in the block FB0 at the time t1 is calculated by the following equation.

$$A_0 = (KB_{00} + B_{10})\alpha \quad (9)$$

Similarly, the transmission path vectors A1 to A3 in the blocks FB1 to FB3 are calculated as follows.

$$A_1 = (kB_{01} + B_{11})\alpha \quad (10)$$

$$A_2 = (kB_{02} + B_{12})\alpha \quad (11)$$

$$A_3 = (kB_{03} + B_{13})\alpha \quad (12)$$

The transmission path vectors A0 to A3 in the blocks calculated as explained above are expressed as vectors on the I-Q plane. These transmission path vectors A0 to A3 indicate amounts of displacement of the phase and amplitude given to the transmission signals in the frequency bands of the blocks in the transmission path.

Figure 15:
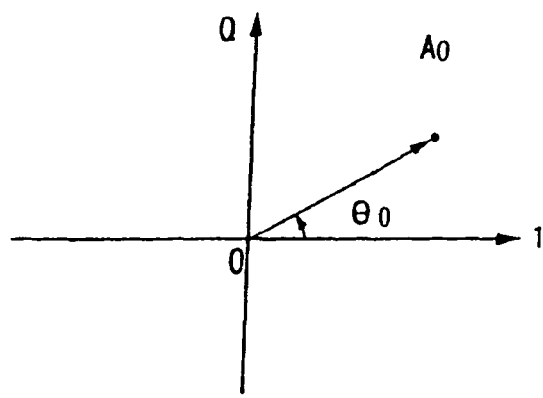
FIG. 15 is a view of an example of a vector showing a transfer characteristic of the transmission path.

FIG. 15 shows for example the transmission path vector A0 in the block FB0 on the I-Q plane as an example thereof As illustrated, in the frequency band of the block FB0, a phase displacement of θo is given to the transmission signal transmitted via the transmission path. The amplitude becomes |A0| times.

The transmission path estimation circuit 214 of the receiving apparatus shown in FIG. 12 performs the above processing by the channel equalizer. As a result, the influence exerted upon each transmission signal of the frequency band can be estimated in the transmission path, therefore by correcting the I-component and the Q-component of a received symbol by using the calculated transmission path vector in the bit extraction circuit 213, the error of the phase and the amplitude occurring in the transmission path can be corrected and thus the influence of the transmission path can be eliminated.

Next, an explanation is provided of another example of the bit extraction circuit in the receiving apparatus of the present invention. The bit extraction circuit 213 of FIG. 12 can be applied to received symbols modulated by the QPSK and 16QAM methods. Below, an explanation will be made of examples of a bit extraction circuit 213a which can be used for QPSK and 8PSK and a bit extraction circuit which can be used for QPSK, 16QAM, and further 64QAM modulation methods by referring to FIG. 16 and FIG. 17.

Figure 16:
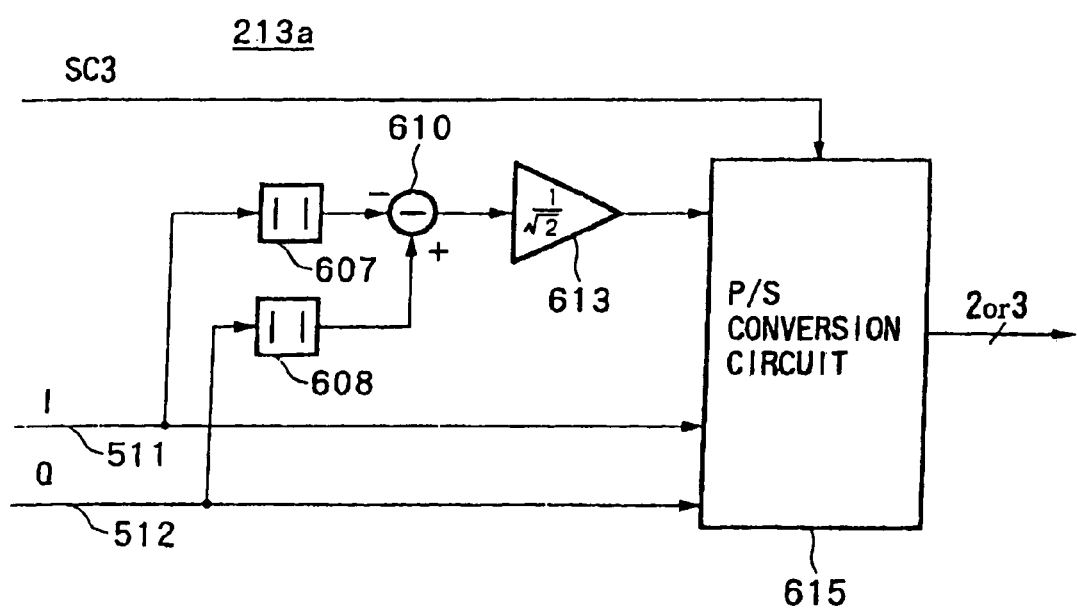
FIG. 16 is a block diagram of an example of a bit extraction circuit which can be applied to a 8PSK modulation method.

FIG. 16 is a circuit diagram of an example of the configuration of the bit extraction circuit 213a which can be used for the QPSK and 8PSK modulation methods. As illustrated, this bit extraction circuit 213a is configured by absolute value operation circuits 607 and 608, a subtraction circuit 610, an amplitude adjustment circuit 613, and a parallel/serial conversion circuit (P/S conversion circuit) 615. The absolute value operation circuit 607 calculates the absolute value of an I-signal input via the signal line 511, while the absolute value operation circuit 608 calculates the absolute value of a Q-signal input via the signal line 512. The subtraction circuit 610 subtracts the output signals of the absolute value operation circuits 608 and 607 and supplies the result of the subtraction to the amplitude adjustment circuit 613.

The amplitude adjustment circuit 613 multiplies the output signal of the subtraction circuit 610 by the square root of ($\frac{1}{2}$) and outputs the result. The parallel/serial conversion circuit 615 outputs two bits or three bits of the received data in accordance with the I-signal and the Q-signal input from the signal lines 511 and 512 and the output signal of the amplitude adjustment circuit 613 in response to the control signal SC3 input from the outside.

Below, an explanation is provided of the operation of the bit extraction circuit 213a of the present example.

The I-signal and the Q-signal with the transmission path errors corrected by the transmission path estimation circuit are input via the signal lines 511 and 512 to the bit extraction circuit 213a. The absolute value operation circuits 607 and 608 calculate the absolute values of the I-signal and the Q-signal and input them to the subtraction circuit 610. The subtraction circuit 610 subtracts the absolute value of the I-signal from the absolute value of the Q-signal and outputs the result of the subtraction to the amplitude adjustment circuit 613. The amplitude adjustment circuit 613 adjusts the result of the subtraction of the subtraction circuit 613 to the square root of ($\frac{1}{2}$) time.

The parallel/serial conversion circuit 615 operates in response to the control signal SC3 output from the outside. Note that the control signal SC3 indicates by which of the QPSK modulation method or 8PSK modulation method the received symbol has been modulated.

When the received symbol has been QPSK modulated, all of the absolute value operation circuits 607 and 608, subtraction circuit 610, and the amplitude adjustment circuit 613 are set in a nonoperating state, and the parallel/serial conversion circuit 615 selects the I-signal and the Q-signal input via the signal lines 511 and 512 and outputs them as the first bit and the second bit soft judgment values.

On the other hand, when the received symbol is 8PSK modulated, the absolute value operation circuits 607 and 608, the subtraction circuit 610, and the amplitude adjustment circuit 613 operate. The parallel/serial conversion circuit 615 outputs the I-signal and the Q-signal input from the signal lines 511 and 512 as the first bit and the second bit soft judgment values and outputs the output signal of the amplitude adjustment circuit 613 as the third bit soft judgment value.

As explained above, according to the bit extraction circuit 213a of the present example, two bits of the received data are extracted in accordance with the QPSK modulated received symbols and three bits of the received data are extracted in accordance with the 8PSK modulated received symbols. Note that both of the QPSK modulated received symbols and 8PSK modulated received symbols are phase modulated signals wherein only the phases of the received signals are modulated in accordance with the transmission data, that is, the information of the transmission data is not contained in the amplitude, therefore the amplitude operation circuit required for the bit extraction circuit shown in FIG. 12 becomes unnecessary. For this reason, the circuit configuration of the bit extraction circuit 213a is simpler as shown in FIG. 16.

Figure 17:
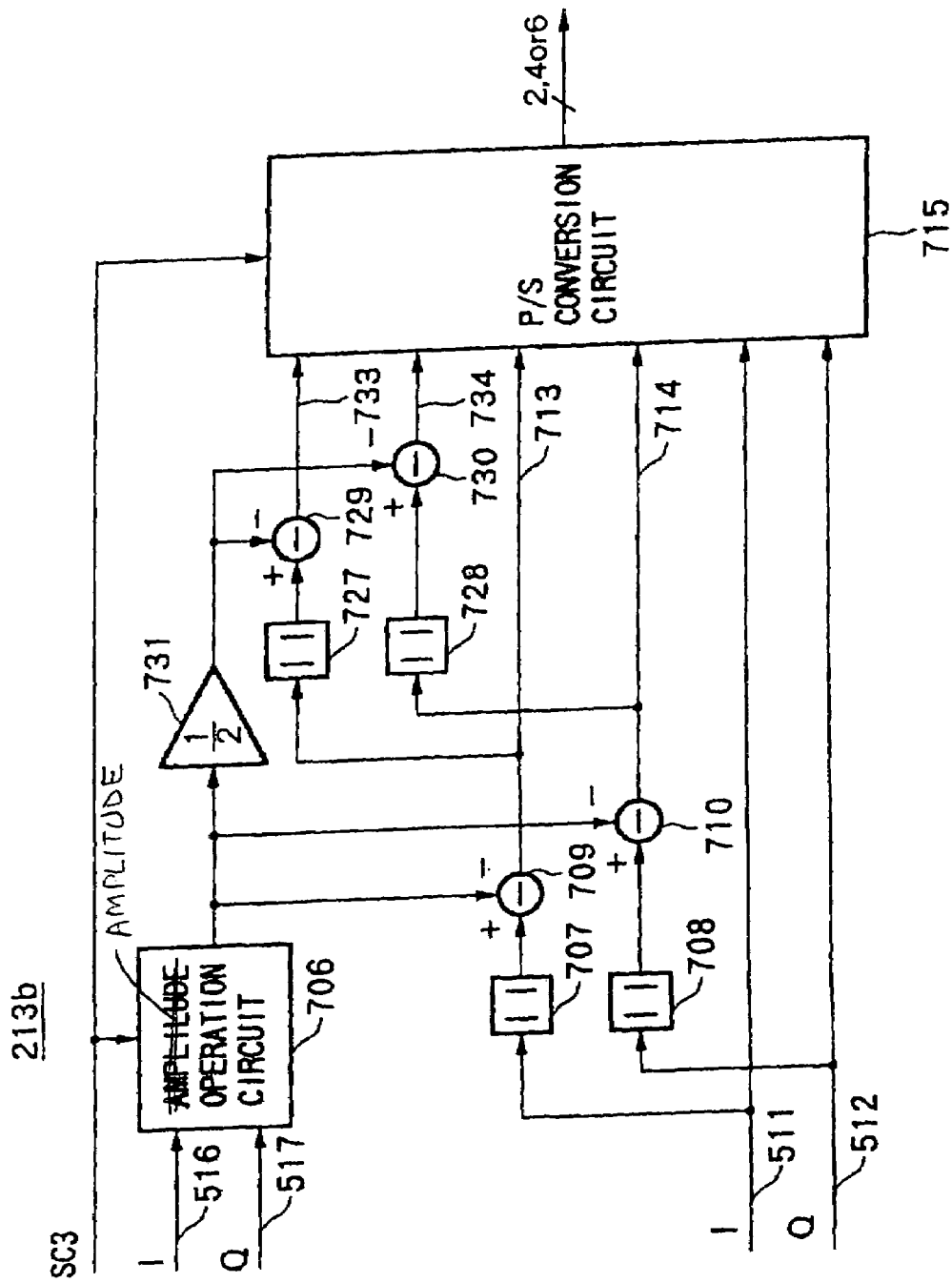
FIG. 17 is a block diagram of an example of a bit extraction circuit which can be applied to the QPSK, 16QAM, and 64 QAM modulation methods.

FIG. 17 is a circuit diagram of an example of the configuration of a bit extraction circuit 213b that can be used for the QPSK, 16QAM, and 64QAM modulation methods. As illustrated, this bit extraction circuit 213b is configured by an amplitude operation circuit 706, absolute value operation circuits 707, 708, 727, and 728, subtraction circuits 709, 710, 729, and 730, an amplitude adjustment circuit 731, and a parallel/serial conversion circuit (P/S conversion circuit) 715.

Note that the 16QAM and 64QAM modulation methods are multi-value modulation methods modulating both of the phase and the amplitude of the carrier signal in accordance with the transmission data, therefore the bit extraction circuit 213b of the present example is provided with the amplitude operation circuit 706 for calculating the amplitude of the received symbols.

The amplitude operation circuit 706 calculates a square of the amplitude of the transmission path vector in accordance with the I-signal and the Q-signal indicating the transmission path vector input from the transmission path estimation circuit via the signal lines 516 and 517 and further outputs a value obtained by multiplying the calculated absolute value of the amplitude by the square root of ($\frac{2}{5}$) or the square root of ($\frac{8}{21}$). For example, when the received symbols are 16QAM modulated, the amplitude operation circuit 706 outputs a value obtained by multiplying the calculated absolute value of the amplitude of vector by the square root of ($\frac{2}{5}$), while when the received symbols are 64QAM modulated, the amplitude operation circuit 706 outputs a value obtained by multiplying the calculated absolute value of the amplitude of vector by the square root of ($\frac{8}{21}$). The absolute value operation circuits 707 and 708 calculate the absolute values of the I-signal and the Q-signal input via the signal lines 511 and 512 and output the same to the subtraction circuits 709 and 710. The subtraction circuits 709 and 710 subtract the output signals of the absolute value operation circuits 707 and 708 from the output signal of the amplitude operation circuit 706 and output the results of the subtraction to the signal lines 713 and 714. The absolute value operation circuits 727 and 728 calculate the absolute values of the signals of the signal lines 513 and 514, that is, the output signals of the subtraction circuits 709 and 710, and output the same to the subtraction circuits 729 and 730. The amplitude adjustment circuit 731 finds a signal obtained by halving the amplitude of the output signal of the amplitude operation circuit 706 and supplies the same to the subtraction circuits 729 and 730. The subtraction circuits 729 and 730 subtract the output signals of the absolute value operation circuits 727 and 728 from the output signal of the amplitude adjustment circuit 731 and output the results of the subtractions to the signal lines 733 and 734. The parallel/serial conversion circuit 715 outputs two bits, four bits, or six bits of the received data in accordance with the I-signal and the Q-signal input from the signal lines 711 and 712, the output signals of the subtraction circuits 709 and 710 input from the signal lines 713 and 714, and the output signals of the subtraction circuits 729 and 730 input from the signal lines 733 and 734 in response to the control signal SC3 input from the outside.

Below, an explanation is provided of the operation of the bit extraction circuit 213b of the present example.

The I-signal and the Q-signal indicating a received symbol with the transmission path error corrected by the transmission path estimation circuit are input via the signal lines 511 and 512 to the bit extraction circuit 213b. The absolute value operation circuits 707 and 708 calculate the absolute values of the I-signal and the Q-signal and input the to the subtraction circuits 709 and 710.

On the other hand, the I-component and the Q-component of the transmission path vector are input via the signal lines 516 and 517 to the amplitude operation circuit 706 from the transmission path estimation circuit. The amplitude operation circuit 706 calculates the absolute value of the amplitude of the transmission path vector 706 and outputs a value obtained by multiplying the calculated absolute value of the amplitude by the square root of (⅖).

The subtraction circuits 709 and 710 subtract the output signals of the absolute value operation circuits 707 and 708 from the output signal of the amplitude operation circuit 706 and supplies the results of the subtractions via the signal lines 713 and 714 to the parallel/serial conversion circuit 715. Further, the absolute value operation circuits 727 and 728 calculate the absolute values of the output signals of the subtraction circuits 709 and 710. The subtraction circuits 729 and 730 subtract the output signals of the absolute value operation circuits 727 and 728 from the output signal of the amplitude adjustment circuit 731 and supply the same via the signal lines 733 and 734 to the parallel/serial conversion circuit 715.

The parallel/serial conversion circuit 715 operates in response to the control signal SC3 input from the outside. Note that the control signal SC3 indicates by which of the QPSK, 16QAM, or 64QAM modulation methods the received symbols has been modulated.

When the received symbols are QPSK modulated, the parallel/serial conversion circuit 715 selects the I-signal and the Q-signal input via the signal lines 511 and 512 and outputs the same as the first bit and the second bit soft judgment values. In this case, in the bit extraction circuit 213b, all of the partial circuits other than the parallel/serial conversion circuit 715 are set in the nonoperating state.

When the received symbols are 16QAM modulated, the absolute value operation circuits 727 and 728, subtraction circuits 729 and 730, and amplitude adjustment circuit 731 are set in the nonoperating state, and the other partial circuits are in the operating state. The parallel/serial conversion circuit 715 outputs the I-signal and the Q-signal input from the signal lines 511 and 512 as the first bit and the second bit soft judgment values and outputs the output signals of the subtraction circuits 709 and 710 input from the signal lines 713 and 714 as the third bit and the fourth bit soft judgment values.

When the received symbols are 16QAM modulated, all partial circuits configuring the bit extraction circuit 213b operate. The parallel/serial conversion circuit 715 outputs the I-signal and the Q-signal input from the signal lines 511 and 512 as the first bit and the second bit soft judgment values, outputs the output signals of the subtraction circuits 709 and 710 input from the signal lines 713 and 714 as the third bit and the fourth bit soft judgment values, and further outputs the output signals of the subtraction circuits 729 and 730 input from the signal lines 733 and 734 as the fifth bit and the sixth bit soft judgment values.

As explained above, the bit extraction circuit 213b of the present example can be used for received symbols of either of the QPSK, 16QAM, or 64QAM system. When the received symbols are QPSK modulated, the bit extraction circuit 213b extracts the two bits of the received data corresponding to the received symbols, while when the received symbol is 16QAM modulated, the bit extraction circuit 213b extracts the four bits of the received data corresponding to the received symbols. Further, where the received symbol is 64QAM modulated, the bit extraction circuit 213b extracts the six bits of the received data corresponding to the received symbols.

Figure 18:
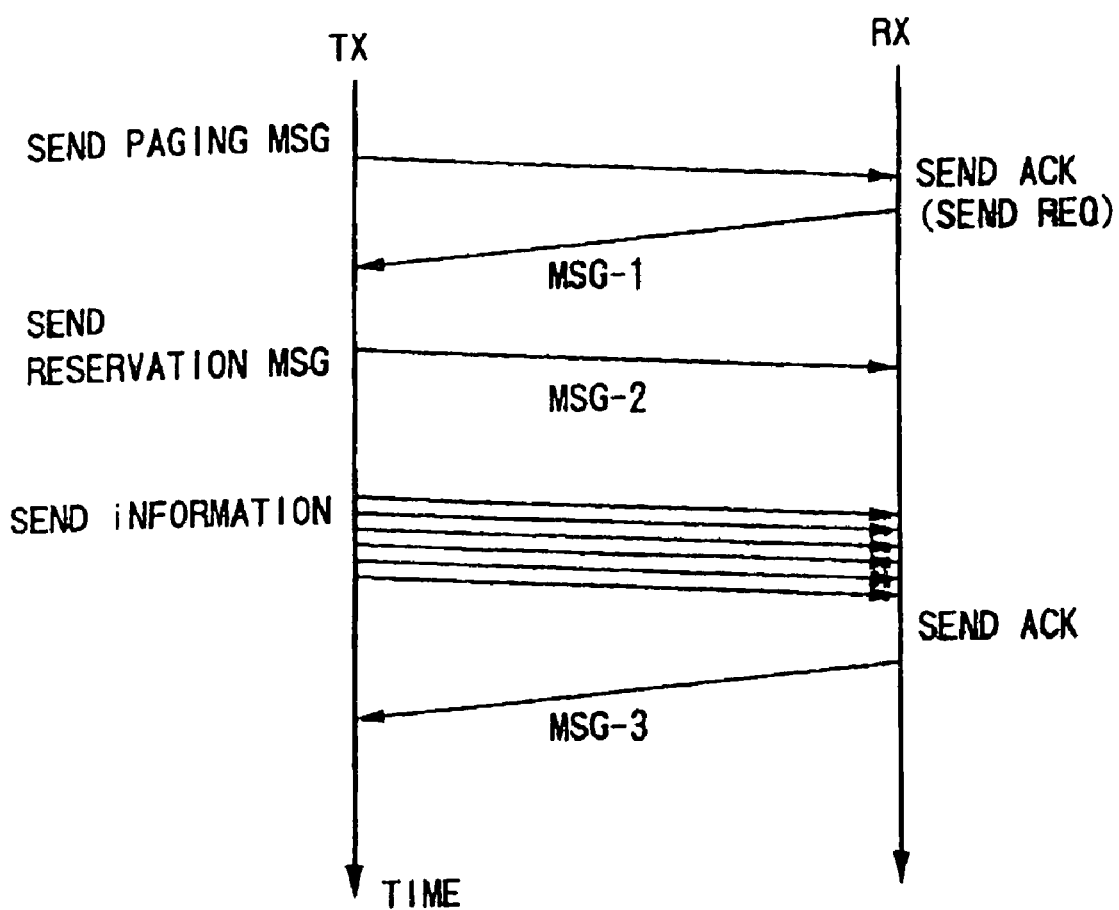
FIG. 18 is a view of a communication operation in a communication system of the present invention.

FIG. 18 represents the operation of a second embodiment of the present invention and, specifically, the operations of transmission and reception of data in the communication system of the present invention.

Note that the communication system of the present invention is configured by the transmitting apparatus shown in FIG. 1 and the receiving apparatus shown in FIG. 2. This communication system transfers the data from the transmitting apparatus to the receiving apparatus. Below, an explanation is provided of the operation of the communication system of the present embodiment by referring to FIG. 18.

The communication system of the present embodiment is a mobile telecommunication system. The transmitting apparatus transmits call information and calls the receiving apparatus as the other party of the communication. When it receives a response from the receiving apparatus and confirms the receiving apparatus, data communication is commenced. Below, a detailed explanation will be made of the communication system operation by referring to FIG. 18.

Note that in FIG. 18, TX indicates a master station in the transmitting apparatus or the mobile telecommunication system, and RX indicates the user in the receiving apparatus or the mobile telecommunications.

At the start of communication, first, a call message (Paging MSG) is transmitted by the transmitting apparatus (master station) TX. This call message is transmitted by a channel dedicated to the call referred to as a paging channel. Note that a call can be reliably made even when the receiving apparatus is in a sleep mode. This paging channel uses a predetermined transmission path estimation method. Here, in the case where the size of the call message is small, differential phase modulation in the frequency direction is employed as the transmission path estimation method. Note that the transmission path estimation method in the call message is not limited to this, other methods determined at the transmission and reception sides in advance can also be applied.

Note that the call message includes an instruction as to which channel each receiving apparatus should transmit the response signal over, so when the receiving apparatus (user) RX receives the call message, it transmits a response signal ACK to the master station through a designated channel.

The user RX is basically in the sleep mode except during communication for reducing power consumption of the unit. It intermittently receives data by the paging channel to check if a call message addressed to it has been transmitted. When a call message addressed to it is transmitted, the user transmits a response signal ACK including the information that it is ready to receive a call to the master station using the channel designated by the paging message. Note that this response message includes information indicating the type of the transmission path estimation method which can be processed by the user RX.

The case where the request of start of communication was made from the master station TX was shown above, but when communication is requested from the user RX, for example, when there is a request from the user RX to receive certain information, a request signal REQ adding what information is wanted to information substantially the same as the response signal ACK is transmitted from the user RX toward the master stations utilizing a channel referred to as a random access channel.

The master station TX determines the operating state of the user after identifying the user when receiving the response signal ACK or the request signal REQ from the user. For example, it determines the modulation signal method, the transmission path estimation method, and the like that can be processed by the receiving apparatus of the user and determines the modulation method and the transmission path estimation method to be used for the communication. The master station TX transmits a reservation message (Reservation MSG) designating the transmission start time, channel number to be used for the transmission, and the transmission path estimation method to be used for the reception to the user RX. When the designated time arrives, the master station TX transmits the modulated signal corresponding to the designated transmission path estimation method to the user RX in the designated channel based on the transmission information.

On the other hand, when receiving the reservation message from the master station TX, the user RX receives the signal by the designated transmission path estimation method in the designated channel at the designated time. Then, it extracts the required information from the received signal. When it decides that there is no error in the information, it notifies the master station TX that it could correctly receive the information and the communication is terminated.

Below, an explanation is provided of formats of the response signal ACK or the request signal REQ transmitted from the user RX and the reservation message transmitted by the master station TX.

Figure 19:
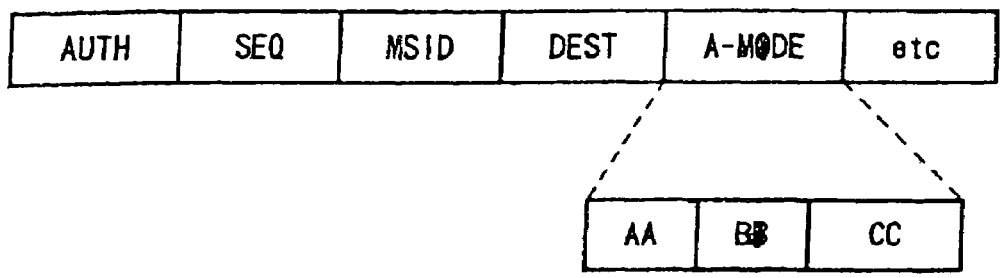
FIG. 19 is a view of the format of a response signal transmitted by the receiving apparatus.

FIG. 19 represents the formats of the response signal ACK and the request signal REQ transmitted from the user RX to the master station. Note that as shown in FIG. 19, these signals will be referred to as MSG-1 hereinbelow. As shown in FIG. 19, the MSG-1 is comprised of at least six fields AUTH, SEQ, DEST, MSID, A-MOD, and "etc." Below, an explanation is provided of the contents of the fields.

AUTH is an authentication field of the user. The master station TX identifies the user which transmitted the MSG-1 based on the information of the related authentication field. SEQ is a sequence number field. A sequence number of the user is contained in the related field. MSID is a field indicating an ID number of the receiver. DEST is a destination field. The data indicating the destination of the transmission data is contained in the related field. A-MODE is a field comprised by parameters indicating a mode which can be handled by the apparatus. As illustrated, A-MODE is further divided into three sub-fields AA, BB, and CC. For example, the data indicating the transmission path estimation method is contained in the sub-field AA, the data indicating the modulation method is contained in the sub-field BB, and further data indicating reception state is contained in the sub-field CC. "etc." is a field comprised by other attached information. For example, data indicating the attribute of the receiving apparatus, content of the request signal REQ, etc. are contained.

Figure 20:
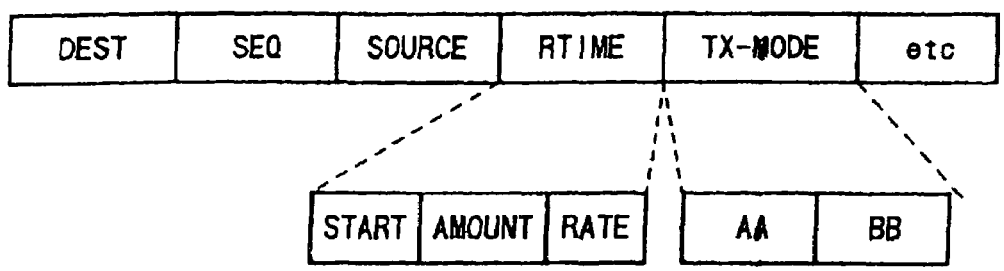
FIG. 20 is a view of the format of a reservation message transmitted by the transmitting apparatus.

Next, an explanation is provided of the format of the reservation message MSG-2 transmitted from the master station TX. FIG. 20 is a view of the format of the MSG-2. As illustrated, MSG-2 is comprised by at least six fields DEST, SEQ, SOURCE, RTIME, TX-MODE, and "etc." Below, an explanation will be made of the contents of the fields.

DEST is the destination field. For example, the data indicating the destination of communication, that is, the identification number of the user to be received etc. are contained in the related field. SEQ is the sequence number field. The sequence number of the user is contained in the related field. SOURCE is the identification field of an originating side. Data indicating the identification number (ID number) of the originating side, that is, the transmitting master station is contained in the related field. RTIME is the reservation time field. As illustrated, the related field is comprised by three sub-fields. Data indicating the start time of reservation is contained in a sub-field START, data indicating an amount of data transmission is contained in a sub-field AMOUNT, and data indicating a data transmission rate is contained in a sub-field RATE. TX-MODE is the field indicating the parameter of the transmission signals. As illustrated, this field is comprised by two sub-fields. Data indicating for example the method of the estimation of the transmission path is contained in the sub-field AA, and data indicating for example the modulation method of the transmission signals is contained in the sub-field BB. "etc." is the field indicating the other attached information.

Next, an explanation is provided of the format of the response signal MSG-3 transmitted from the user RX when terminating the reception of the transmission data from the master station TX.

Figure 21:
FIG. 21 is a view of a format of a signal for notifying the result of reception transmitted by the receiving apparatus.
Figure 22:
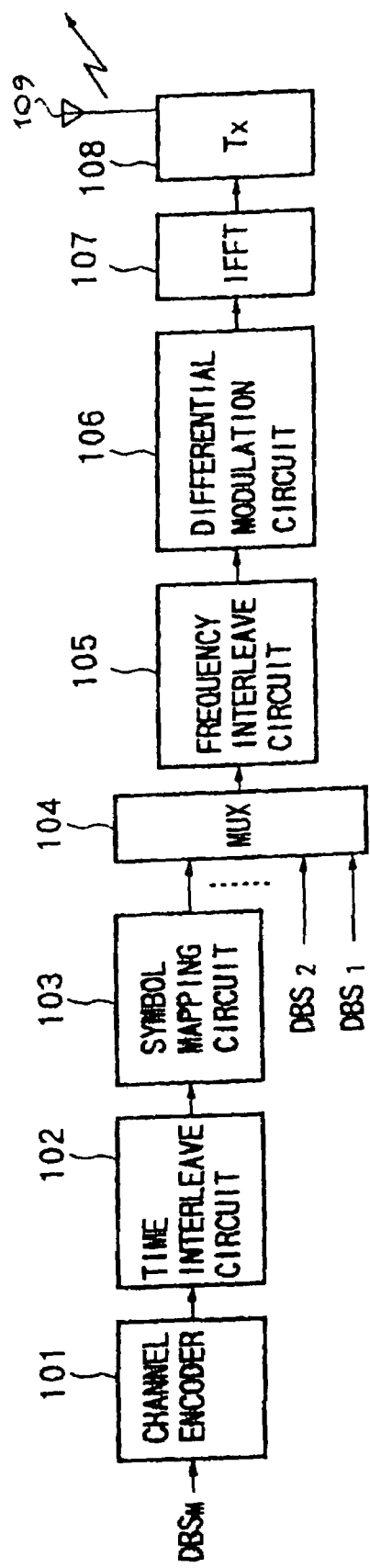
FIG. 22 is a block diagram of an example of the configuration of a transmitting apparatus of the prior art.
Figure 23:
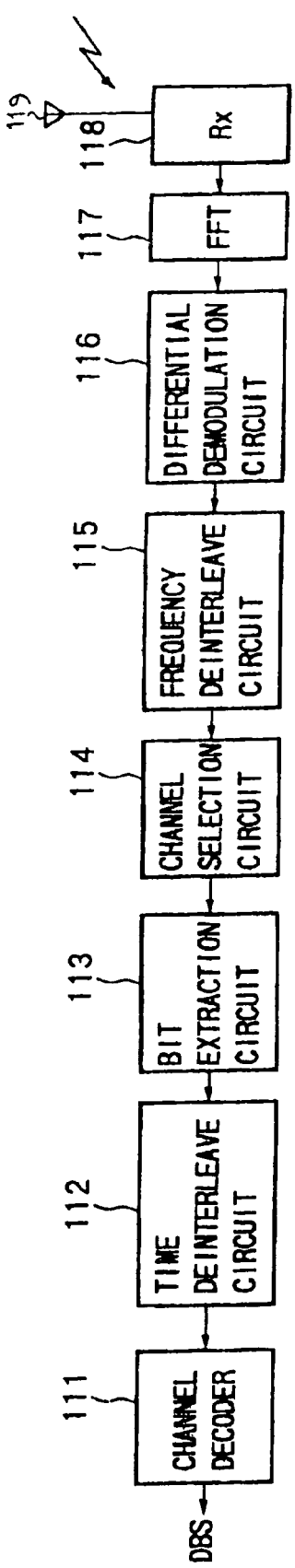
FIG. 23 is a block diagram of an example of the configuration of a receiving apparatus of the prior art.
Figure 24:
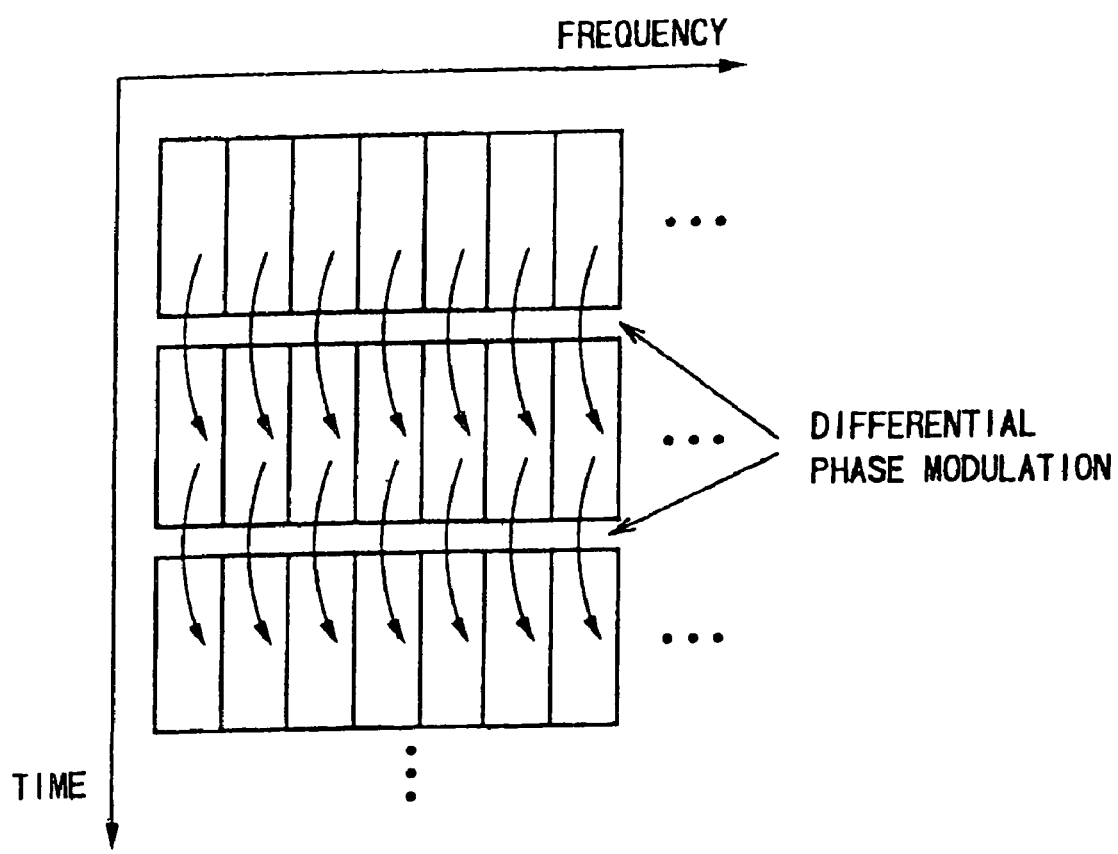
FIG. 24 is a view of differential phase modulation in a transmitting and receiving apparatus of the prior art.

As illustrated in FIG. 21, the MSG-3 has at least four fields SEQ, MSID, DEST, and "etc." Below, an explanation will be made of each. SEQ is the sequence number field. The sequence number of the user is contained in the related field. MSID is the field indicating the ID number of the receiver. DEST is the destination field. Data indicating the destination of the transmission data is contained in the related field. "etc." is the field comprised by other attached information. For example, data indicating the attribute of the receiving apparatus and the content of the request signal REQ are contained.

As explained, according to the present embodiment, in the communication system configured by the transmitting apparatus and the receiving apparatus, for example, a mobile telecommunication system, the communication is started by a call message transmitted from the transmitting apparatus (master station) TX or a request signal transmitted from the receiving apparatus (user) RX. By the response of the user with respect to the call message or the request signal from the user, the reception mode which can be handled by the user RX, for example, the method of estimation of the transmission path and the signal modulation method, is informed to the master station TX. The master station TX selects the transmission path estimation method and the signal modulation method in response to that, reserves the communication channel, and transmits the information to the user RX. After the end of the transmission, after confirming if the transmission of the information was normally terminated from the response signal from the user RX, the master station TX terminates the communication.

As explained above, according to the transmitting apparatus, receiving apparatus, and communication system comprising the transmitting and receiving apparatus of the present invention, when handling information of a burst like nature having a dynamic range with a large data capacity such as packet transmission traffic, it is possible to apply a modulation method and transmission path estimation method adapted to this in accordance with for example the amount of information per packet and the attribute of the transmission data such as the importance of the data and therefore possible to transmit and receive information with a high efficiency of the communication system as a whole.

Further, by making the modulation method and the transmission path estimation method variable, it is possible to configure the transmitting and receiving apparatus by the smallest possible circuit size.

Further, in a communication system using different modulation methods and transmission path estimation methods, by designating the transmission path estimation method and the modulation method by the transmission side before the transmission and reception of data, the receiver side can receive information according to the designated modulation method and transmission path estimation method, so there is the advantage that the transmission and the reception of the information can be smoothly carried out.

What is claimed is:

1. A receiving apparatus for receiving a multi-carrier modulated signal to which a predetermined transmission path estimation is processed by a transmitting apparatus, comprising:
    an orthogonal transform circuit for orthogonally transforming a received signal,
    a transmission path estimation circuit for estimating a characteristic of a transmission path in response to a processing of an estimation of the transmission path carried out by said transmitting apparatus based on an output signal of said orthogonal transform circuit, and
    a data output circuit for correcting said received signal in response to a result of the estimation of said transmission path estimation circuit and outputting the received data,
    a deinterleave circuit for rearranging the data in an output signal from said data output circuit to restore the data to an original order,
    wherein said transmission path estimation circuit includes:
    a differential demodulation circuit for differentially demodulating the output signal of said orthogonal transform circuit at a predetermined time as a reference signal when said transmitting apparatus performs the differential modulation, and
    a transmission path equalization circuit for extracting a pilot signal from the output signal of said orthogonal transform circuit when adding the pilot signal to the transmission data by said transmitting apparatus and estimating characteristics of the transmission path in response to the extracted pilot signal.

2. A receiving apparatus as set forth in claim 1, wherein said differential demodulation circuit has:
    a storage circuit for storing the output signal of said orthogonal transform circuit, and
    a phase correction circuit for correcting a phase of the output signal of said orthogonal transform circuit with a predetermined storage signal among said stored signals as the reference signal in response to the modulation method of differential modulation in the transmitting apparatus.

3. The receiving apparatus as set forth in claim 1, wherein said transmission path equalization circuit includes:
    a pilot extraction circuit for extracting a pilot signal from the output signal of said orthogonal transform circuit,
    a first addition circuit, in a case where said extracted pilot signal is divided into groups established in accordance with the frequency bands, for adding pilot signals of each group with at least one pilot signal from an adjoining group,
    a multiplication circuit for multiplying a result of addition of the pilot signals at an adjoining previous modulation time on the time axis by a predetermined coefficient, and
    a second addition circuit for adding a result of addition of the first addition circuit at a present point of time and an output signal of said multiplication circuit.

4. The receiving apparatus as set forth in claim 1, wherein said data output circuit outputs the received data of a predetermined number of bits based on said received signal in accordance with the modulation method of the received signal.

* * * * *